(12) United States Patent
Tanaka

(10) Patent No.: US 10,807,032 B2
(45) Date of Patent: Oct. 20, 2020

(54) EXHAUST GAS PURIFICATION FILTER

(71) Applicant: CATALER CORPORATION, Kakegawa-shi, Shizuoka (JP)

(72) Inventor: Eriko Tanaka, Kakegawa (JP)

(73) Assignee: CATALER CORPORATION, Kakegawa-shi (JP)

(*) Notice: Subject to any disclaimer, the term of this patent is extended or adjusted under 35 U.S.C. 154(b) by 0 days.

(21) Appl. No.: 16/304,258

(22) PCT Filed: May 30, 2017

(86) PCT No.: PCT/JP2017/019984
§ 371 (c)(1),
(2) Date: Nov. 23, 2018

(87) PCT Pub. No.: WO2017/209083
PCT Pub. Date: Dec. 7, 2017

(65) Prior Publication Data
US 2019/0299139 A1    Oct. 3, 2019

(30) Foreign Application Priority Data

Jun. 2, 2016 (JP) .................. 2016-111360
Mar. 31, 2017 (JP) .................. 2017-072784

(51) Int. Cl.
*B01J 21/04* (2006.01)
*B01J 23/44* (2006.01)
(Continued)

(52) U.S. Cl.
CPC ..... *B01D 46/0061* (2013.01); *B01D 46/2429* (2013.01); *B01D 53/94* (2013.01);
(Continued)

(58) Field of Classification Search
CPC ... B01J 21/04; B01J 23/44; B01J 35/04; B01J 35/06; B01J 35/1061; B01J 35/1066;
(Continued)

(56) References Cited

U.S. PATENT DOCUMENTS 7,524,350 B2 *   4/2009  Kunieda ............ B01D 39/2075
                                                            428/312.8
8,192,517 B2 *   6/2012  Kunieda .................. B01J 35/04
                                                            55/523
(Continued)

FOREIGN PATENT DOCUMENTS

EP    2 103 342 A1    9/2009
EP    2 105 200 A1    9/2009
(Continued)

OTHER PUBLICATIONS

Sep. 25, 2019 Office Action issued in European Patent Application No. 17734150.0.
(Continued)

*Primary Examiner* — Cam N. Nguyen
(74) *Attorney, Agent, or Firm* — Oliff PLC

(57) ABSTRACT

An exhaust gas purification filter that suppresses an increase in pressure loss associated with the formation of a catalyst layer and is excellent in PM burning quality. The exhaust gas purification filter includes a base and a catalyst layer provided on the base. The catalyst layer contains a carrier and a metal catalyst. Large pores having a circle equivalent diameter greater than 5 μm occupy, when an area of the catalyst layer is 100% in an electron microscope observation image of a cross section of the catalyst layer, 45% or more of the area.

14 Claims, 11 Drawing Sheets

(51) Int. Cl.

| | |
|---|---|
| *B01J 35/04* | (2006.01) |
| *B01J 35/06* | (2006.01) |
| *B01J 35/10* | (2006.01) |
| *B01D 46/00* | (2006.01) |
| *B01D 46/24* | (2006.01) |
| *F01N 3/035* | (2006.01) |
| *F01N 3/10* | (2006.01) |
| *F01N 3/28* | (2006.01) |
| *B01D 53/94* | (2006.01) |
| *B01J 37/00* | (2006.01) |
| *B01J 37/02* | (2006.01) |

(52) U.S. Cl.
CPC ............ *B01D 53/944* (2013.01); *B01J 21/04* (2013.01); *B01J 23/44* (2013.01); *B01J 35/04* (2013.01); *B01J 35/06* (2013.01); *B01J 35/109* (2013.01); *B01J 35/1061* (2013.01); *B01J 35/1066* (2013.01); *B01J 35/1071* (2013.01); *B01J 35/1076* (2013.01); *B01J 37/0009* (2013.01); *F01N 3/035* (2013.01); *F01N 3/101* (2013.01); *F01N 3/103* (2013.01); *F01N 3/105* (2013.01); *F01N 3/2842* (2013.01); *B01D 53/945* (2013.01); *B01D 2046/2433* (2013.01); *B01D 2046/2437* (2013.01); *B01D 2255/1021* (2013.01); *B01D 2255/1023* (2013.01); *B01D 2255/1025* (2013.01); *B01D 2255/908* (2013.01); *B01D 2255/9022* (2013.01); *B01D 2255/9155* (2013.01); *B01D 2255/9202* (2013.01); *B01D 2255/9205* (2013.01); *B01D 2279/30* (2013.01); *B01J 37/0248* (2013.01); *F01N 2330/06* (2013.01); *Y02T 10/22* (2013.01)

(58) Field of Classification Search
CPC .. B01J 35/1071; B01J 35/1076; B01J 35/109; B01D 46/0061; B01D 46/2429; F01N 3/035; F01N 3/101; F01N 3/103; F01N 3/105; F01N 3/2842
See application file for complete search history.

(56) References Cited

U.S. PATENT DOCUMENTS

| | | | |
|---|---|---|---|
| 8,455,391 B2* | 6/2013 | Hanaki | ................ B01D 53/944 502/304 |
| 8,802,017 B2* | 8/2014 | Mizutani | ............ B01D 46/2429 422/177 |
| 2005/0074374 A1 | 4/2005 | Ogura | |
| 2011/0071019 A1 | 3/2011 | Hanaki et al. | |
| 2012/0240541 A1 | 9/2012 | Isoda et al. | |

FOREIGN PATENT DOCUMENTS

| | | |
|---|---|---|
| EP | 2 158 956 A1 | 3/2010 |
| EP | 2 324 904 A2 | 5/2011 |
| JP | 2001-329829 A | 11/2001 |
| JP | 2006-206390 A | 8/2006 |
| JP | 4284588 B2 | 6/2009 |
| JP | 2011-036742 A | 2/2011 |
| JP | 2011-104524 A | 6/2011 |
| JP | 5643692 B2 | 12/2014 |
| WO | 2011/077168 A1 | 6/2011 |

OTHER PUBLICATIONS

Sep. 7, 2017 International Search Report issued in International Patent Application No. PCT/JP2017/019984.

* cited by examiner

FIG.7
(a)
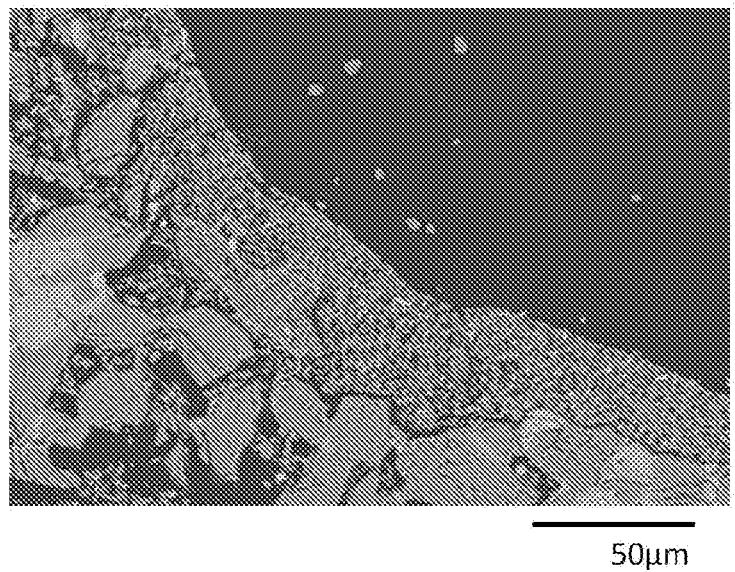
(b)
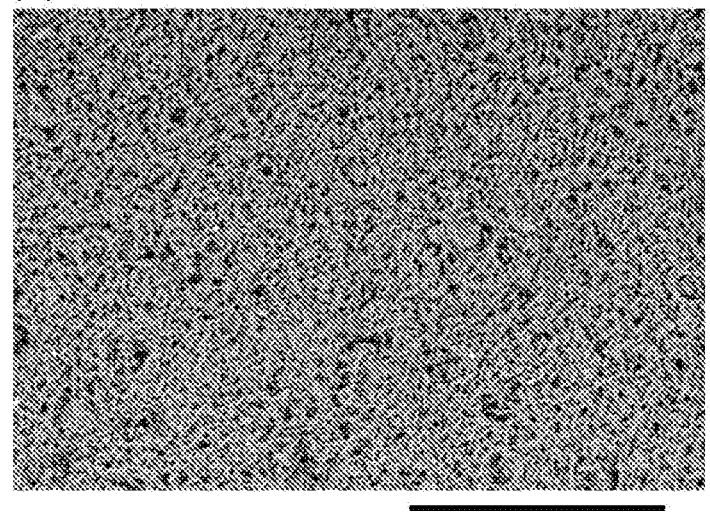

FIG.8
(a)
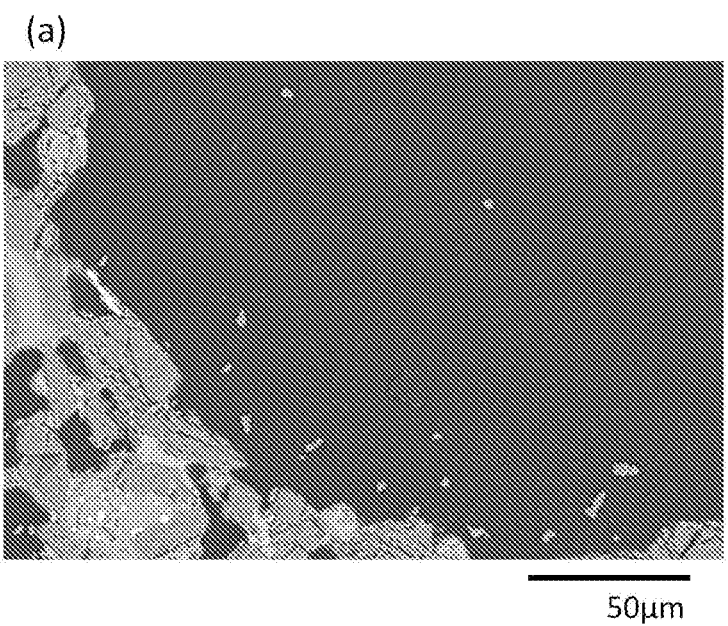
50μm
(b)
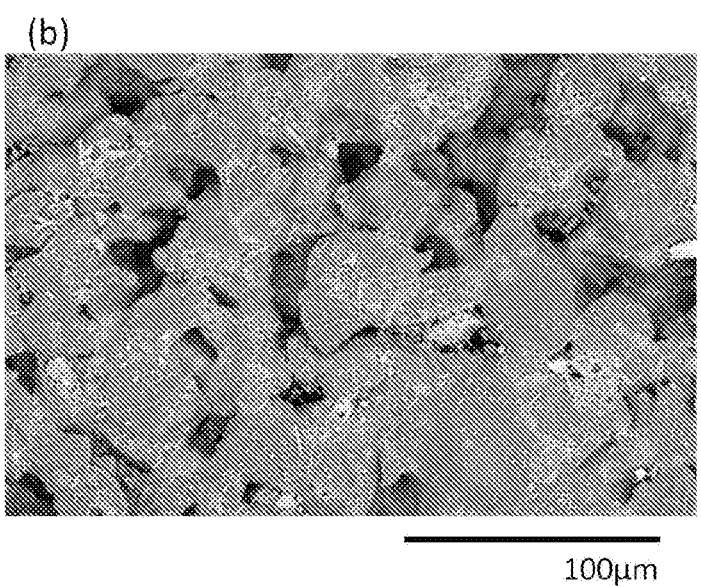
100μm

100μm

FIG. 10
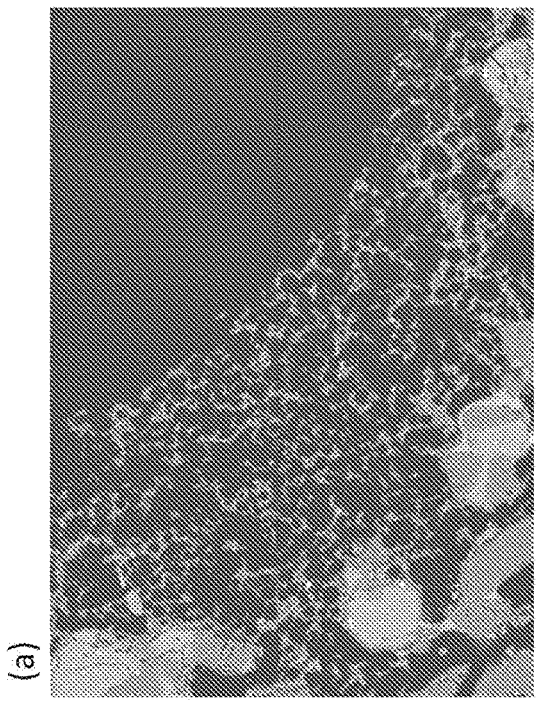
(a)
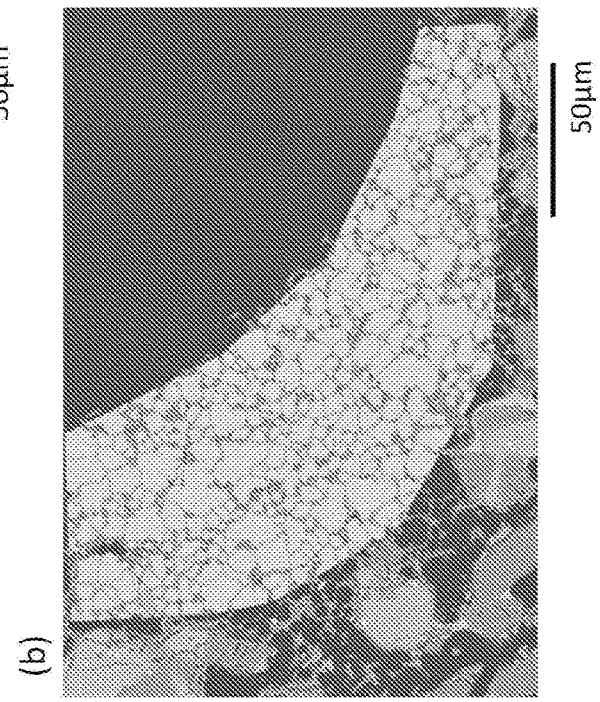
(c)
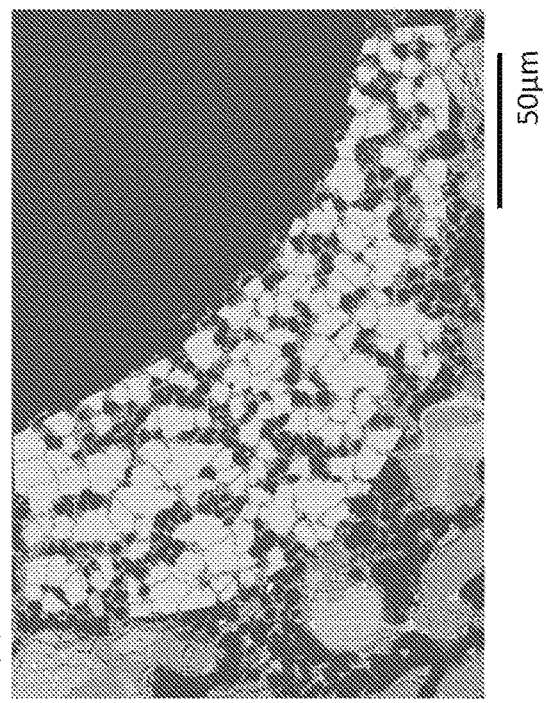
(b)

EXHAUST GAS PURIFICATION FILTER

TECHNICAL FIELD

The present invention relates to an exhaust gas purification filter. Specifically, the present invention relates to an exhaust gas purification filter having a catalyst layer with a PM collection function.

Note that the present application claims priority based on Japanese Patent Application No. 2016-111360 (filed on Jun. 2, 2016) and Japanese Patent Application No. 2017-072784 (filed on Mar. 31, 2017), the entire contents of which are incorporated herein by reference.

BACKGROUND ART

Exhaust gas exhausted from an internal combustion engine such as a diesel engine contains PM (Particulate Matter) mainly composed of carbon. In order to efficiently collect and remove PM from exhaust gas, an exhaust gas purification filter has been conventionally used. As such, a DPF (Diesel Particulate Filter) has been, for example, used in a diesel engine.

An exhaust gas purification filter needs to be subjected to regeneration processing to periodically remove collected PM. As a related technology, Patent Literature 1 has been known. Patent Literature 1 discloses an exhaust gas purification filter having a porous base and a catalyst layer formed on the surface of the base and inside the pores thereof and containing a metal catalyst. In the exhaust gas purification filter, the contact between PM and the metal catalyst is improved with the formation of pores having a prescribed size in the catalyst layer to increase PM purification efficiency.

CITATION LIST

Patent Literature

PTL 1: Japanese Patent Application Laid-open No. 2011-36742

SUMMARY OF INVENTION

Technical Problem

However, studies conducted by the present inventors reveal that the flow path of exhaust gas is likely to be narrowed with a reduction in the gas permeability of the catalyst layer when the catalyst layer is arranged on the base. Therefore, fuel economy may be reduced due to an increase in the pressure loss of the exhaust gas purification filter itself, i.e., a pressure loss (product pressure loss before the collection of PM). Accordingly, from the viewpoint of improving the fuel economy while suppressing the pressure loss, it is necessary to reduce the coating amount of the catalyst layer per unit volume of the exhaust gas purification filter. On the other hand, in the regeneration processing of the exhaust gas purification filter, it has been demanded to improve the burning reactivity of PM to increase a regeneration ratio. From the viewpoint of improving the burning reactivity of the PM, it is necessary to increase the coating amount of the catalyst layer per unit volume of the exhaust gas purification filter to improve the contact between the PM and a metal catalyst. That is, since the suppression of the pressure loss and an improvement in the burning reactivity (regeneration ratio) of the PM are in a trade-off relationship as for the catalyst layer, there has been demanded an exhaust gas purification filter that satisfies both the functions.

The present invention has been made in order to solve such problems and has an object of providing an exhaust gas purification filter that suppresses an increase in pressure loss associated with the formation of a catalyst layer and is excellent in PM burning quality.

Solution to Problem

The present invention discloses an exhaust gas purification filter arranged in an exhaust path of an internal combustion engine and collecting particulate matter in exhaust gas exhausted from the internal combustion engine. The exhaust gas purification filter includes a base and a catalyst layer provided on the base. The catalyst layer contains a carrier and a metal catalyst. Large pores having a circle equivalent diameter greater than 5 μm occupy, when an area of the catalyst layer is 100% in an electron microscope observation image of a cross section of the catalyst layer, 45% or more of the area.

The catalyst layer having the structure has relatively large pores at a high ratio compared with a catalyst layer as described in, for example, Patent Literature 1. The gas permeability of the catalyst layer is improved. Therefore, in the exhaust gas purification filter, an excellent gas flow path is ensured in the filter after the formation of the catalyst layer, and an increase in pressure loss associated with the formation of the catalyst layer can be suppressed.

In addition, the catalyst layer functions as a filtration layer in the exhaust gas purification filter. That is, the intrusion of PM into the pores of the filter is suppressed since the catalyst layer exhibits a PM collection function. Therefore, an increase in pressure loss at PM collection can be kept small compared with an exhaust gas purification filter as described in, for example, Patent Literature 1. In addition, pressure loss hysteresis can be reduced.

Moreover, PM collection on the surface of the catalyst layer is promoted since the catalyst layer exhibits a function as a filtration layer in the exhaust gas purification filter. As a result, PM and the catalyst layer are positioned close to each other to increase PM burning quality. Accordingly, an excellent filter regeneration ratio can be realized.

Further, in a typical exhaust gas purification device, the amount of PM (PM deposition amount) collected by an exhaust gas purification filter is estimated based on a pressure loss. That is, when the pressure loss becomes a prescribed value or more, the exhaust gas purification device performs regeneration processing with the determination that the PM collection amount has been increased. In the exhaust gas purification filter disclosed herein, a pressure loss is stably increased according to a PM collection amount. Therefore, the PM collection amount can be precisely estimated based on an increase in pressure loss, and regeneration controllability can also be improved.

In a preferred embodiment of the exhaust gas purification filter disclosed herein, the large pores occupy, when an area of whole pores is 100% in the electron microscope observation image of the cross section of the catalyst layer, 60% or more of the area. Thus, the gas permeability of the catalyst layer becomes more excellent, and an increase in pressure loss or a PM collection pressure loss associated with the formation of the catalyst layer can be more excellently suppressed. Accordingly, the effect of the present invention can be exhibited at high level.

Further, in another preferred embodiment of the exhaust gas purification filter disclosed herein, a porosity of the catalyst layer is 70% or more in the electron microscope observation image of the cross section of the catalyst layer. Thus, an increase in pressure loss or a PM collection pressure loss associated with the formation of the catalyst layer can be more excellently suppressed. Accordingly, the effect of the present invention can be exhibited at high level.

Further, in another preferred embodiment of the exhaust gas purification filter disclosed herein, the catalyst layer has a multiple pore structure with first pores having a pore size of 1 μm or more and less than 10 μm and second pores having a pore size of 0.5 μm or more and less than 1 μm. Thus, a more excellent PM collection function can be exhibited since the catalyst layer has a structure with multiple levels of pore sizes (openings). As a result, the intrusion of PM into pores inside a partition wall can be highly suppressed. Accordingly, the effect of the present invention can be exhibited at high level.

Further, in a preferred embodiment of the exhaust gas purification filter disclosed herein, a pore volume of the first pores is four times or more of a pore volume of the second pores in pore distribution measurement of a mercury porosimeter. Thus, the gas permeability of the catalyst layer can become more excellent, and the suppression of a pressure loss and an improvement in PM burning quality can be balanced at higher level.

Further, in another preferred embodiment of the exhaust gas purification filter disclosed herein, a surface opening ratio is 25% or more in an electron microscope observation image of a surface of a framework of the catalyst layer. Thus, the number of exhausted PM particles can be more excellently reduced with an increase in the PM collection efficiency of the catalyst layer. In addition, the PM burning quality of the catalyst layer can be more excellently improved.

Further, in another preferred embodiment of the exhaust gas purification filter disclosed therein, both a pore size $P_5$ corresponding to a cumulative 5% pore size from a small pore side and a pore size $P_{95}$ corresponding to a cumulative 95% pore size from the small pore side are 0.02 μm or more and 4 μm or less in the electron microscope observation image of the surface of the framework of the catalyst layer. Thus, PM collection efficiency and mechanical strength can be balanced at high level. In addition, the PM burning quality of the catalyst layer can be more improved.

Further, in another preferred embodiment of the exhaust gas purification filter disclosed herein, the base has a wall flow structure in which input-side cells with an end thereof on an exhaust gas inflow side opened and output-side cells with an end thereof on an exhaust gas outflow side opened are partitioned by a porous partition wall, and the catalyst layer is provided on a surface of the partition wall on a side of the input-side cells. Thus, the PM collection efficiency or the PM burning quality of the catalyst layer can be more increased. In addition, a PM collection pressure loss can be noticeably kept small. Moreover, regeneration controllability can be more improved with pressure loss hysteresis more excellently suppressed.

Further, in a more preferred embodiment, the catalyst layer provided on the surface on the side of the input-side cells is provided to have, when a whole length in an extending direction of the partition wall is 100%, a length 90% or more of the whole length along the extending direction of the partition wall from the end on the exhaust gas inflow side. Thus, at least one of effects (a reduction in PM collection pressure loss, the suppression of pressure loss hysteresis, an improvement in PM collection efficiency, and an improvement in PM burning quality) described above can be exhibited at higher level. Accordingly, the effect of the present invention can be exhibited at higher level.

In another preferred embodiment of the exhaust gas purification filter disclosed herein, a second catalyst layer containing a carrier and a metal catalyst is formed inside the base. In the exhaust gas purification filter, the metal catalyst carried by the catalyst layer on the surface of the partition wall secondarily functions with respect to the catalyst activity of the metal catalyst contained in the second catalyst layer. In addition, the intrusion of PM into the second catalyst layer formed inside the base can be prevented since the PM is collected by the porous catalyst layer in the exhaust gas purification filter disclosed herein. Thus, the PM can be prevented from inhibiting the catalyst action of the second catalyst layer. Therefore, according to the embodiment, the exhaust gas purification filter can suitably purify a harmful substance (such as CO, HC, and $NO_x$) in exhaust gas with the second catalyst layer exhibiting high exhaust gas purification performance.

BRIEF DESCRIPTION OF DRAWINGS

FIGS. 7(a) and 7(b) are SEM observation images according to Reference Example 1, FIG. 7(a) being a cross-section SEM observation image of a catalyst layer, FIG. 7(b) being a surface SEM observation image of the catalyst layer.

FIGS. 8(a) and 8(b) are SEM observation images according to Reference Example 2, FIG. 8(a) being a cross-section SEM observation image of a catalyst layer, FIG. 8(b) being a surface SEM observation image of the catalyst layer.

FIGS. 10(a) to 10(c) are explanatory views for describing a method for calculating the ratio of pores from a cross-section SEM observation image of a catalyst layer, FIG. 10(a) being a cross-section SEM observation image (at a magnification of 600 times) of the catalyst layer of Example 1 used for analysis, FIG. 10(b) being an image showing the parts of pores after image processing, FIG. 10(c) being an image showing the parts of large pores after the image processing.

DESCRIPTION OF EMBODIMENTS

Hereinafter, a description will be given of some preferred embodiments of the present invention with reference to the drawings. In the following drawings, members and portions producing the same functions will be denoted by the same symbols, and their duplicated descriptions will be omitted or simplified where necessary. Dimensional relationships (such as lengths, widths, or thicknesses) in the respective drawings do not necessarily reflect actual dimensional relationships. Note that matters not included in matters particularly mentioned in the present specification and necessary for carrying out the present invention (for example, a general matter such as the arrangement of an exhaust gas purification filter in an automobile) can be grasped as design matters for skilled persons based on conventional technologies in the field concerned. The present invention can be carried out based on contents disclosed in the present specification and technical knowledges in the field concerned.

<Exhaust Gas Purification Device 1>

Figure 1:
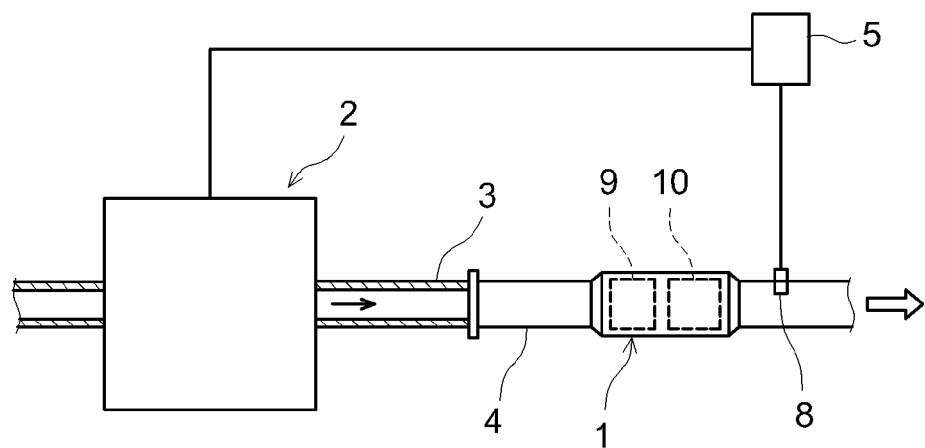
FIG. 1 is a view schematically showing an exhaust gas purification device according to an embodiment.

First, a description will be given of the configuration of an exhaust gas purification device 1 having an exhaust gas purification filter 10 according to an embodiment of the present invention. FIG. 1 is a schematic view of the exhaust gas purification device 1 according to the embodiment. The exhaust gas purification device 1 is provided in the exhaust system of an internal combustion engine 2.

A mixture containing oxygen and fuel gas is supplied to the internal combustion engine (engine) 2. The internal combustion engine 2 burns the mixture and converts burning energy into mechanical energy. The mixture burned at this time is exhausted to the exhaust system as exhaust gas. The internal combustion engine 2 having a configuration shown in FIG. 1 is configured mainly by the diesel engine of an automobile. Note that the exhaust gas purification device 1 is, of course, applicable to an engine (such as a gasoline engine) other than a diesel engine.

The exhaust gas purification device 1 has an exhaust path (including an exhaust manifold 3 and an exhaust pipe 4), an ECU 5, an exhaust temperature increasing catalyst 9 containing a carrier and a metal catalyst, and the exhaust gas purification filer (DPF) 10. The exhaust gas purification device 1 collects particulate matter (PM) contained in exhaust gas while purifying harmful substances (for example, carbon monoxide (CO), hydrocarbon (HC), and nitrogen oxide ($NO_x$)) contained in the exhaust gas exhausted from the internal combustion engine 2.

An exhaust port (not shown) that makes the internal combustion engine 2 and the exhaust system communicate with each other is connected to one end of the exhaust manifold 3. The other end of the exhaust manifold 3 is connected to the exhaust pipe 4. Note that an arrow in the figure indicates the circulating direction of exhaust gas. Here, the exhaust path for exhaust gas includes the exhaust manifold 3 and the exhaust pipe 4. In the exhaust pipe 4, the exhaust temperature increasing catalyst 9 and the exhaust gas purification filter 10 are arranged. In the embodiment, the exhaust temperature increasing catalyst 9 is provided on the upstream side of the exhaust gas purification filter 10. The exhaust temperature increasing catalyst 9 has the function of increasing the temperature of exhaust gas flowing into the exhaust gas purification filter 10 during the regeneration of the exhaust gas purification filter 10. The exhaust temperature increasing catalyst 9 may be, for example, a known diesel oxidation catalyst (DOC), a three-way catalyst, a $NO_x$ occlusion reduction catalyst (LNT), or the like. The exhaust temperature increasing catalyst 9 may be, for example, a catalyst containing precious metal such as platinum (Pt), palladium (Pd), and rhodium (Rh). However, the exhaust temperature increasing catalyst 9 is not necessarily provided and may be omitted where necessary. Note that since the configuration of the exhaust temperature increasing catalyst 9 does not characterize the present invention, its description will be omitted herein.

The ECU 5 is an engine control unit that controls the internal combustion engine 2 and the exhaust gas purification device 1. The ECU 5 has a digital computer like, for example, a general control unit. In addition, the ECU 5 can have a central calculation processing unit (CPU: central processing unit) that executes the instruction of a control program, a ROM (read only memory) that stores the control program executed by the CPU, a RAM (random access memory) that is used as a working area in which the control program is to be developed, and a storage unit (recording medium) such as a memory that stores various data.

The ECU 5 is provided with an input port (not shown). The ECU 5 is electrically connected to sensors (for example, a pressure sensor 8) provided at the respective portions of the internal combustion engine 2 and the exhaust gas purification device 1. Thus, information detected by the respective sensors is transmitted as an electric signal to the ECU 5 via the input port. In addition, the ECU 5 is provided with an output port (not shown). The ECU 5 transmits a control signal via the output port to control the internal combustion engine 2 and the exhaust gas purification device 1.

As an example, the ECU 5 estimates to what extent PM is collected by the exhaust gas purification filter 10 (PM collection amount) based on a pressure loss value detected by the pressure sensor 8. When the pressure loss value becomes a prescribed value or more, the ECU 5 increases the temperature of the exhaust gas purification filter 10 to a prescribed temperature to burn and remove the PM. Since pressure loss hysteresis is kept small in the exhaust gas purification filter 10 disclosed herein, the PM collection amount can be precisely estimated based on the pressure loss value detected by the pressure sensor 8. Accordingly, the exhaust gas purification device 1 having the exhaust gas purification filter 10 is excellent in regeneration controllability. In addition, the exhaust gas purification device 1 can minimize the frequency of regeneration processing to improve fuel economy.

<Exhaust Gas Purification Filter 10>

Next, a description will be given of the exhaust gas purification filter 10.

Figure 2:
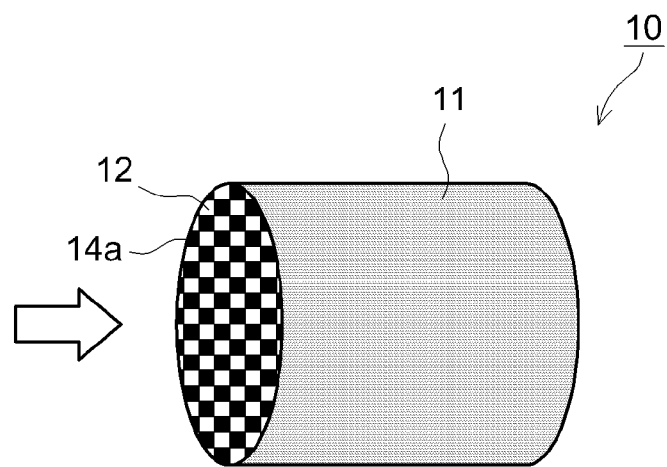
FIG. 2 is a perspective view schematically showing an exhaust gas purification filter according to the embodiment.
Figure 3:
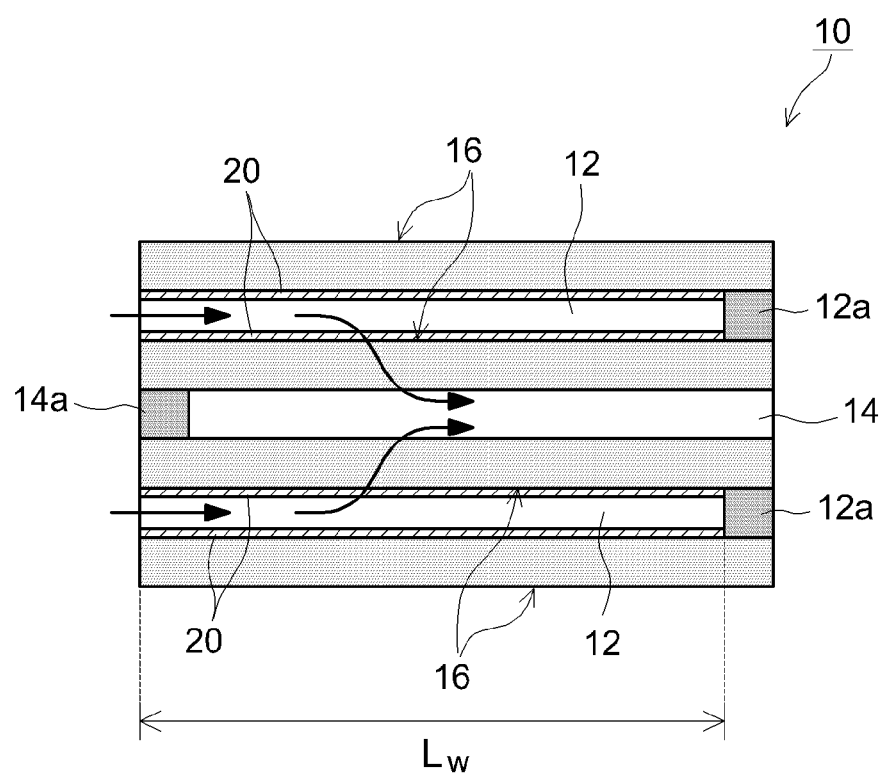
FIG. 3 is a cross-sectional view schematically showing the exhaust gas purification filter according to the embodiment.

FIG. 2 is a perspective view of the exhaust gas purification filter 10 according to the embodiment. FIG. 3 is a schematic view in which a part of a cross section obtained by cutting off the exhaust gas purification filter 10 according to the embodiment in a cylinder axis direction is enlarged. Note that in FIGS. 2 and 3, an exhaust gas flowing direction is drawn by an arrow. That is, the left side and the right side of FIGS. 2 and 3 are the upstream side and the downstream side of the exhaust path (the exhaust pipe 4), respectively.

The exhaust gas purification filter 10 has the function of collecting particulate matter (PM) contained in exhaust gas and purifying the exhaust gas. The exhaust gas purification filter 10 of the embodiment has a base 11 having a wall flow structure and a porous catalyst layer 20 provided on the base 11. Hereinafter, the base 11 and the catalyst layer 20 will be described in this order.

The base 11 constitutes the framework of the exhaust gas purification filter 10. As the base 11, any of bases having various materials and modes conventionally used as this type can be employed appropriately. For example, a base made of a material having high heat-resistance properties as represented by ceramics such as cordierite, aluminum titanate, and silicon carbide (SiC) or an alloy such as stainless steel can be preferably employed. The base 11 can have an outer shape such as a cylindrical shape, an elliptic cylindrical shape, and a polygonal cylindrical shape. In FIG. 2, the base 11 having a cylindrical outer shape is employed as an example. In addition, the base 11 can have, for example, a shape such as a honeycomb shape, and a foam shape, a pellet shape. In the mode of FIG. 2, the base 11 having a honeycomb shape is employed as an example.

The properties of the base 11 (for example, the capacity and the whole length Lw in the exhaust gas flowing direction of the base 11) are not particularly limited. The base 11 has input-side cells 12 with their end on an exhaust-gas inflow side opened, output-side cells 14 with their end on an exhaust-gas outflow side opened, and a partition wall 16 that partitions the input-side cells 12 and the output-side cells 14. Sealing portions 12a are arranged at the ends of the input-side cells 12 on the exhaust-gas outflow side to seal the same. Sealing portions 14a are arranged at the ends of the output-side cells 14 on the exhaust-gas inflow side to seal the same. The input-side cells 12 and the output-side cells 14 can have a rectangular shape such as a square, a parallelogram, rectangle, and a trapezoid, a triangular shape, other polygonal shapes (for example, a hexagon and an octagon), or various geometric shapes such as a circular shape.

The partition wall 16 that partitions the input-side cells 12 and the output-side cells 14 has a porous structure that allows exhaust gas to pass through. The average pore size of the partition wall 16 is not particularly limited, but may be substantially 5 to 30 µm, for example, 10 to 20 µm from the viewpoint of improving a PM collection function, suppressing an increase in pressure loss, or the like. The thickness of the partition wall 16 is not particularly limited, but may be substantially about 1 to 30 mil (1 mil is equivalent to about 25.4 µm) from the viewpoint of improving the PM collection function, suppressing an increase in pressure loss, or the like. The porosity of the partition wall 16 is not particularly limited, but may be substantially 20 to 70 vol %, for example 30 to 60 vol % from the viewpoint of improving the PM collection function, suppressing an increase in pressure loss, or the like.

In the embodiment, the catalyst layer 20 is provided on the wall surface of the partition wall 16. In FIG. 3, the catalyst layer 20 is provided on the wall surface of the partition wall 16 contacting the input-side cells 12. The catalyst layer 20 forms the core of the exhaust gas purification filter as a portion where PM in exhaust gas is to be collected. The catalyst layer 20 contains a carrier constituting the framework of the catalyst layer 20 and a metal catalyst (reactive catalyst) to excellently burn and remove collected PM.

As the carrier constituting the framework of the catalyst layer 20, any of carriers having various materials and modes conventionally used as this type can be employed appropriately. For example, a carrier made of a material having high heat-resistance properties such as alumina ($Al_2O_3$), ceria ($CeO_2$), zirconia ($ZrO_2$), silica ($SiO_2$), and titania ($TiO_2$) can be preferably employed. The shape of the carrier may be a needle having a high aspect ratio. Note that the "needle" described in the present specification is a concept including a shape called, for example, a long rod shape, a wire shape, a scale shape, or the like. The average aspect ratio of particles constituting the carrier (a value obtained by dividing a length in the long axis direction of the particles by a length (typically a diameter) in the short axis direction thereof) may be substantially three or more, preferably five or more, and for example about ten to 50. The average length in the long axis direction of the particles constituting the carrier may be substantially 0.1 µm or more, preferably 0.5 µm or more, and for example 1 to 10 µm. The average length (typically a diameter) in the short axis direction of the particles constituting the carrier may be substantially 0.01 µm or more, preferably 0.05 µm or more, and for example 0.1 to 1 µm.

The metal catalyst functions as an oxidation and/or a reduction catalyst. As the metal catalyst, any metal species capable of functioning as various oxidation catalysts or reduction catalysts can be employed appropriately. Examples of the metal catalyst include precious metal such as rhodium (Rh), palladium (Pd), and platinum (Pt) categorized as a platinum group. Alternatively, ruthenium (Ru), osmium (Os), iridium (Ir), silver (Ag), gold (Au), or the like may be used. In particular, it is preferable to use palladium and platinum having high oxidation activity in combination. The content of the metal catalyst is not particularly limited, but may be substantially 0.01 to 8 mass %, and for example about 0.1 to 5 mass % relative to, for example, the whole mass of the carrier of the catalyst layer 20.

The catalyst layer 20 may appropriately contain any other components besides the carrier and the metal catalyst. Examples of such components include various additives such as an OSC material (for example, a ceria-zirconia multiple oxide) having oxygen occlusion capacity, a $NO_x$ absorbing agent having $NO_x$ occlusion capacity, and a stabilizing material.

The width (disposed area) of the catalyst layer 20 is not particularly limited. The catalyst layer 20 may be provided on, for example, the whole or only some parts of the wall surface of the partition wall 16. As an example, when the whole surface area of the partition wall 16 is 100%, the catalyst layer 20 may coat substantially 50% or more, for example 80% or more, and preferably 90% or more of the surface. In the exhaust gas purification filter 10 having a wall flow structure as shown in FIG. 3, when the whole length Lw in the extending direction (the exhaust gas flowing direction) of the partition wall 16 is 100%, the length of the catalyst layer 20 may be substantially 50% or more, typically 80% or more, preferably 90% or more, and, for example, the same as the whole length Lw in the extending direction of the partition wall 16. Thus, the PM collection function can be more excellently improved. When 90% or more of the whole surface area of the partition wall 16 is coated with the catalyst layer 20, PM hardly intrudes into pores inside the partition wall 16 of the base 11. Therefore, the pressure loss hysteresis can be remarkably kept small with the collection of the PM in the pores inside the partition wall 16 suppressed. Note that the catalyst layer 20 may be provided on the wall surface of the partition wall 16 sequentially or intermittently. In addition, the length of the catalyst layer 20 can be adjusted with the input amount of slurry in, for example, a manufacturing method that will be described later.

The average thickness (the length crossing the extending direction of the partition wall 16) of the catalyst layer 20 is not particularly limited, but may be substantially 1 to 300 μm, typically 5 to 100 μm, and for example about 10 to 50 μm from the viewpoint of exhibiting the effect of the invention of the present application at high level and more excellently exhibiting the PM collection function. In addition, the coating amount of the catalyst layer 20 per 1 L of the base is not particularly limited, but may be substantially 100 g/L or less, preferably 50 g/L or less, and for example 30 g/L or less from the viewpoint of reducing a pressure loss at higher level.

In the catalyst layer 20, the occupation of a substantial portion, particularly the framework of the catalyst layer 20 is kept small compared with a conventional technology. In other words, the catalyst layer 20 has structural properties in which the porosity is high and the gas permeability is excellent. The porosity Va of the catalyst layer 20 (i.e., the ratio of the pores occupied in the catalyst layer 20) calculated based on electron microscope observation may be substantially 60% or more, preferably 70% or more, substantially 90% or less, typically 85% or less, and for example 80% or less. With the porosity Va set at a prescribed value or more, the gas permeability of the catalyst layer 20 becomes more excellent and the pressure loss hysteresis can be more excellently reduced. In addition, in the catalyst layer 20, burning activity can be improved with an increase in the contact points between PM and the metal catalyst, and $NO_2$ generated when NO in exhaust gas is oxidized is allowed to easily reach the PM with an improvement in the proximity between the PM and the metal catalyst. Therefore, PM burning quality at low temperature can be increased, and the regeneration ratio of the exhaust gas purification filter 10 can be improved. With the porosity Va set at the prescribed value or less, the mechanical strength of the catalyst layer 20 can be improved. The porosity Va can be adjusted with the control of the ratio of mixing a carrier and a pore shaping agent together in slurry or the size (the particle size) of the carrier and/or the pore shaping agent in, for example, the manufacturing method that will be described later.

Note that the porosity Va of the catalyst layer 20 can be calculated as follows.

(1) First, a sample piece containing the catalyst layer 20 is embedded with a resin, and the cross section of the catalyst layer 20 is cut out.

(2) Next, the cut-out cross section of the sample piece is observed with a scanning electron microscope (SEM) to obtain a cross-section SEM observation image (a reflection electron image obtained at an observation magnification of 600 times). Note that a field of view for the observation is set so as to include substantially 20 or more, for example 50 or more of the pores defined by the framework of the catalyst layer 20 to obtain the cross-section SEM observation image.

(3) Then, a processing range is set to the catalyst layer 20 using two-dimensional image analysis software, i.e., winroof (registered trademark), and the occupied portion of the pores is extracted by automatic binarization (discriminant analysis method) to obtain a binary image.

(4) Next, expansion processing and contraction processing are each applied to the binary image twice.

(5) Then, the respective pores are separated so as to have a circular shape by circular separation measurement (automatic processing).

(6) Next, the ratio (area %) of the occupied area of the pores when the area of the catalyst layer is 100% in the analyzed image is measured to calculate the porosity Va.

In the catalyst layer 20, the porosity Vb of large pores calculated based on the electron microscope observation (that is, the ratio of the large pores having a circle equivalent diameter greater than 5 μm and occupied in the catalyst layer 20) may be substantially 45% or more, for example 50% or more, the porosity Va or less, substantially 85% or less, typically 80% or less, and for example 70% or less. With the porosity Vb of the large pores set at a prescribed value or more, gas permeability is improved. Thus, an increase in pressure loss associated with the formation of the catalyst layer 20 is reduced, and PM burning quality can be improved. In addition, with the porosity Vb set at a prescribed value or less, the mechanical strength of the catalyst layer 20 can be improved. The porosity Vb can be adjusted with the control of the ratio of mixing the carrier and the pore shaping agent together in the slurry or the size (the particle size) of the carrier and/or the pore shaping agent in, for example, the manufacturing method that will be described later.

Note that the porosity Vb of the large pores of the catalyst layer 20 can be calculated in such a manner as to measure the ratio (area %) of the occupied area of the pores after subtracting the portions of the pores having a circle equivalent diameter of 5 μm or less from the whole porosity (the porosity calculated in the step (6)) Va of the catalyst layer 20.

In the catalyst layer 20, the ratio of the porosity Vb of the large pores to the porosity Va (Vb/Va) may be substantially 60% or more, preferably 70% or more, substantially 99% or less, typically 98% or less, for example 90% or less, and 80% or less as an example. Thus, the effect of the present invention and maintenance and improvement in mechanical strength can be balanced at high level.

The catalyst layer 20 typically has first pores defined by the framework and second pores formed inside the framework and communicating with the first pores. In other words, the catalyst layer 20 has a multiple pore structure (for example, a binary pore structure) and is configured to be capable of collecting PM even with the framework. The average pore sizes of the first pores and the second pores are typically less than or equal to the average pore size of the pores formed inside the partition wall 16 of the base 11, and preferably smaller than the average pore size of the pores formed inside the partition wall 16 of the base 11.

In a preferred embodiment, the relationship between the sizes of the average pores satisfies the relationship the second pores <the first pores <the pores of the partition wall 16 of the base 11. The mechanical strength or durability of the framework can be improved when the pore size of the second pores is relatively reduced. In addition, since the catalyst layer 20 has a configuration having multistage pore sizes (for example, two-stage pore sizes), a more excellent PM collection function can be exhibited. As a result, with the suppression of the collection of PM in the pores inside the partition wall, pressure loss hysteresis can be more excellently suppressed.

The catalyst layer 20 has the first pores defined by the framework and is configured to have a three-dimensional mesh shape. Any cross section of the catalyst layer 20 can have a plurality of divided portions when the framework is divided. It appears that the larger the number of divided portions (the number of divisions), the higher the communication of the pores is. That is, the number of divisions can be an indicator showing the communication of the pores inside the catalyst layer 20. In the cross section of the catalyst layer 20, the number of divisions per unit cross-sectional area (0.01 mm$^2$) may be substantially ten or more, typically 20 or more, preferably 30 or more, more preferably 50 or more, for example 60 or more, and 80 or more as an example from the viewpoint of improving gas permeability. From the viewpoint of improving mechanical strength, the number of divisions per unit cross-sectional area may be substantially 200 or less, preferably 180 or less, and for example 120 or less.

Note that the number of divisions per unit cross-sectional area of the framework can be calculated as follows.

(1) First, a sample piece containing the catalyst layer 20 is embedded with a resin, and the cross section of the catalyst layer 20 is cut out.

(2) Next, the cut-out cross section of the sample piece is observed with a scanning electron microscope (SEM) to obtain a cross-section SEM observation image (a reflection electron image obtained at an observation magnification of 600 times).

(3) Then, a processing range is set to the catalyst layer 20 using two-dimensional image analysis software, i.e., winroof (registered trademark), and a framework is extracted by automatic binarization (discriminant analysis method) to obtain a binary image.

(4) Next, after expansion processing and contraction processing are each applied to the binary image twice, points having an area smaller than 0.9 μm$^2$ are deleted to remove noise.

(5) Then, the number of divisions of the framework in the analyzed image is read and converted per unit cross-sectional area (0.01 mm$^2$).

The framework may have an average thickness of substantially 5 μm or less, typically 4 μm or less, preferably 3.5 μm or less, and for example 3 μm or less. Thus, an increase in pressure loss associated with the formation of the catalyst layer 20 is suppressed, and the effect of an improvement in low-temperature burning quality due to the proximity between PM and the metal catalyst can be produced at higher level. The lower limit of the average thickness is not particularly limited, but may be substantially 0.5 μm or more, typically 1 μm or more, and for example 1.5 μm or more from the viewpoint of improving mechanical strength.

Note that the average thickness of the framework is calculated in such a manner as to perform the same procedures (1) to (4) as those of the calculation of the number of divisions and then calculate the lengths of the shortest areas (the minimum lengths passing through the gravity) of respective divided portions to take an arithmetic mean of the values.

At the surface of the catalyst layer 20, the framework may have a surface opening ratio of substantially 20% or more, typically 25% or more, preferably 30% or more, substantially 60% or less, typically 55% or less, and for example 50% or less. With the surface opening ratio set at a prescribed value or more, an increase in pressure loss associated with the formation of the catalyst layer can be dramatically suppressed. In addition, with the surface opening ratio set at a prescribed value or less, PM collection function or mechanical strength can be improved.

Note that the surface opening ratio of the framework of the catalyst layer 20 can be calculated as follows.

(1) First, a sample piece containing the catalyst layer 20 is fixed onto the surface of a sample table so that the extending direction of the base 11 and the surface of the sample table become parallel to each other.

(2) Next, the surface of the sample piece is observed with a field emission scanning electron microscope (FE-SEM) to obtain a surface SEM observation image (a secondary electron image obtained at an observation magnification of 20,000 times) from the outermost surface side of the catalyst layer 20.

(3) Then, surface openings are extracted by automatic binarization (discriminant analysis method) using two-dimensional image analysis software, i.e., winroof (registered trademark) to obtain a binary image.

(4) Next, after contraction processing and filling processing are applied to the binary image twice, points having an area of 0.001 μm$^2$ or less are deleted to remove noise.

(5) Then, in the analyzed image, the ratio (area %) of the occupied area of the surface openings when the area of the catalyst layer is 100% is measured to calculate the surface opening ratio.

The average pore size of the second pores formed inside the framework of the catalyst layer 20 is typically smaller than the average pore size of the first pores and smaller than, for example, 5 μm. In addition, a pore size P5 corresponding to a cumulative 5% pore size from the small pore side of pore sizes may be for example 0.01 m or more, preferably 0.02 μm or more, typically 0.03 μm or more, for example 0.035 μm or more, substantially 0.1 μm or less, typically 0.05 μm or less, and for example 0.04 μm or less. In addition, a pore size P95 corresponding to a cumulative 95% pore size from the small pore side of the small pores may be substantially 1 μm or more, typically 1.5 μm or more, for example 2 μm or more, for example 5 μm or less, preferably 4 μm or less, typically 3.5 μm or less, and for example 3 μm or less. In other words, both the pore size P5 and the pore size P95 may be 0.01 to 5 μm and preferably 0.02 to 4 μm. Thus, a PM collection function and mechanical strength can be balanced at high level, and the effect of the invention of the present application can be exhibited at higher level.

Note that the average pore size of the second pores is calculated in such a manner as to perform the same procedures (1) to (4) as those of the calculation of the surface opening ratio and then perform shape characteristic measurement on the analyzed image to measure a circle equivalent diameter.

As described above, the catalyst layer 20 contains the pores equivalent to or smaller in size than the pores formed inside the partition wall 16 of the base 11. A typical example shows that the catalyst layer 20 has two pore peaks in a pore size of 0.5 to 10 μm in a differential pore distribution curve obtained by the measurement of a mercury porosimeter. For example, the catalyst layer 20 can have a peak A in a range in which a pore size is 1 μm or more and 10 μm or less and have a peak B in a range in which the pore size is 0.5 μm or more and 1 μm or less. Each of the two peaks A and B can indicate the first pores defined by the framework of the catalyst layer 20 and the second pores formed inside the framework and communicating with the first pores.

The pore volume (V1) of the peak A derived from the first pores can be different depending on the type of the base 11 or the like, but may be substantially 0.03 $cm^3/g$ or more, preferably 0.04 $cm^3/g$ or more, and more preferably 0.05 $cm^3/g$ or more. Thus, an increase in pressure loss associated with the formation of the catalyst layer 20 is suppressed, and the low-temperature burning quality of PM can be improved at high level. In addition, the pore volume V1 may be substantially 0.1 $cm^3/g$ or less and for example 0.08 $cm^3/g$ or less from the viewpoint of improving mechanical strength.

The pore volume (V2) of the peak B derived from the second pores can be different depending on the type of the base 11 or the like, but is smaller than that of the peak A. The pore volume V2 may be substantially 0.001 $cm^3/g$ or more and preferably 0.002 $cm^3/g$ or more from the viewpoint of exhibiting the effect of the present invention at high level. In addition, the pore volume V2 may be substantially 0.02 $cm^3/g$ or less and for example 0.015 $cm^3/g$ or less from the viewpoint of ensuring the pore volume V1 or improving mechanical strength.

The ratio of the pore volume of the first pores to that of the second pores (V1/V2) may be substantially three or more, preferably four or more, more preferably five or more, and for example six or more. Thus, an increase in pressure loss associated with the formation of the catalyst layer 20 is suppressed, and the low-temperature burning quality of PM can be improved at high level. The upper limit of the ratio is not particularly limited, but may be substantially 30 or less, preferably 20 or less, and for example ten or less from the viewpoint of improving mechanical strength.

Note that the pore distribution of the catalyst layer 20 can be calculated as follows. First, the sample piece of the base 11 having the catalyst layer 20 is prepared, and the pore distribution of the sample piece is measured in a range of 1 to 60,000 psi using a commercially available mercury porosimeter. Thus, a pore distribution curve showing the relationship between a pore size and a pore volume is obtained. The obtained pore distribution curve is compared with a pore distribution curve based on only the base to confirm the state of the pores formed inside the catalyst layer 20.

In addition, the pore volumes of the respective peaks can be calculated from the obtained pore distribution curve. Specifically, a pore volume ($cm^3/g$) per unit mass of the catalyst layer 20 can be calculated in such a manner as to calculate the cumulative pore volumes ($cm^3/g$) of the respective peaks of the sample piece containing the catalyst layer 20 from the cumulative pore volume distribution curve and subtract the pore volume of only the base 11 in the same range.

As shown in FIG. 3, exhaust gas exhausted from the internal combustion engine 2 flows from the end of the base 11 on the exhaust-gas inflow side into the input-side cells 12 of the exhaust gas purification filter 10. The exhaust gas flowing into the input-side cells 12 reaches the output-side cells 14 after passing through the catalyst layer 20 having the porous structure and the partition wall 16. PM in the exhaust gas is collected by the surface of and/or inside the catalyst layer 20 while the exhaust gas passes through the catalyst layer 20. The exhaust gas reaching the output-side cells 14 flows out from the ends of the output-side cells on the exhaust-gas outflow side to the outside of the exhaust gas purification filter 10.

The catalyst layer 20 according to the embodiment has large pores at a relatively high ratio compared with a conventional catalyst layer. The gas permeability is improved with the arrangement of the catalyst layer 20, whereby an increase in pressure loss associated with the catalyst layer 20 can be suppressed. In addition, PM burning quality at a low temperature can be improved due to the proximity between PM and the metal catalyst in the catalyst layer 20.

Moreover, harmful substances other than PM in exhaust gas can be simultaneously purified (rendered harmless) while the exhaust gas passes through the catalyst layer 20. For example, an HC component or a CO component contained in exhaust gas can be oxidized by the metal catalyst to be converted (purified) into water ($H_2O$), carbon dioxide ($CO_2$), or the like. A $NO_x$ component can be reduced by the metal catalyst to be converted (purified) into nitrogen ($N_2$). Further, the catalyst layer 20 according to the embodiment has the multiple pore structure (for example, the binary pore structure) containing the first pores and the second pores, and the framework of the catalyst layer has the PM collection function. Accordingly, the excellent PM collection function can be exhibited. Furthermore, the collection of PM in the pores inside the partition wall 16 is suppressed since the catalyst layer 20 has the multiple pore structure. Accordingly, pressure loss hysteresis can be suppressed.

<Method for Manufacturing Exhaust Gas Purification Filter 10>

For example, the exhaust gas purification filter 10 configured as described above can be manufactured in the following manner.

First, a solution containing salt (for example, nitrate salt) or a complex (for example, tetraammine complex) including a desired metal catalyst species is prepared. The solution is dried and burned after being impregnated with desired carrier powder. Thus, metal-catalyst carrying carrier powder in which the carrier powder carries the metal catalyst can be obtained.

Next, at least the metal-catalyst carrying carrier powder, a pore shaping agent, and an appropriate solvent (for example, ion exchange water) are mixed together at a prescribed ratio to prepare catalyst layer forming slurry.

Then, a desired base 11 is provided. After being applied onto the base 11, the slurry is dried and burned. According to a wet process method, a homogeneous catalyst layer 20 can be preferably formed. Thus, the catalyst layer 20 is formed, and the exhaust gas purification filter 10 can be obtained.

In the preparation of the slurry, the pore shaping agent may be one capable of being removed by thermal decomposition at burning. Examples of the pore shaping agent include starch, carbon powder, active carbon, high polymer organic material (for example, polyethylene, polypropylene, melamine resin, and polymethyl methacrylate (PMMA) resin), or the like. The pore shaping agent may have an average particle size of substantially 2 μm or more, preferably 5 μm or more, and for example about 5 to 20 μm. In addition, the slurry can contain any other additive components besides the metal-catalyst carrying carrier powder, the pore shaping agent, and the solvent.

In the preparation of the slurry, the mixing ratio between the carrier powder and the shaping agent can be one significant factor from the viewpoint of realizing the catalyst layer 20. The mixing ratio between the carrier powder and the pore shaping agent can be different depending on, for example, the properties (for example, the aspect ratio or the length in the long axis direction) of the carrier powder or the like, but may be adjusted so that the volume of the pore shaping agent becomes substantially three times or more, substantially 15 times or less, and for example ten times or less of the volume of the carrier powder. Thus, the catalyst layer 20 excellent in gas permeability can be more excellently realized. As a result, the ratio of an increase in pressure loss with the formation of the catalyst layer 20 can be kept at 1.6 times or less of that obtained when only the base 11 is provided.

In the preparation of the slurry, the viscosity of the slurry can also be one significant factor from the viewpoint of realizing the catalyst layer 20. The slurry may be adjusted to have a viscosity of substantially 30 mPa·s or more, preferably 50 mPa·s or more, and substantially 500 mPa·s or less when a measurement temperature is 25° C. and a shearing speed is 300 to 500 s$^{-1}$. The viscosity of the slurry can be measured by a commercially available viscosity meter (for example, a dynamic visco-elastic measurement device). The catalyst layer 20 can be preferably formed on the surface of the base using the slurry having such a viscosity.

For the adjustment of the viscosity of the slurry, various additives such as a thickening agent, a surfactant, and a dispersing agent can be, for example, used. Example of the thickening agent include cellulosic polymer such as hydroxyethyl cellulose (HEC), methyl cellulose (MC), carboxymethyl cellulose (CMC), hydroxypropyl methyl cellulose (HPMC), and hydroxyethyl methyl cellulose (HEMC). In addition, examples of the surfactant include a non-ionic surfactant.

Further, conditions for drying and burning the slurry are not particularly limited, but the slurry may be, for example, dried for about one to ten hours at about 80 to 300° C. and then burned for about two to four hours at about 400 to 1000° C.

Note that the exhaust gas purification filter disclosed herein may have a second catalyst layer besides the porous catalyst layer. The second catalyst layer is formed inside the partition wall of the base. As described above, the exhaust gas filter disclosed herein can preferably collect PM with the porous catalyst layer formed on the base. Thus, the PM is prevented from intruding into the second catalyst layer formed inside the partition wall, and the inhibition of the catalytic action of the second catalyst layer by the PM can be suppressed. In addition, catalytic metal contained in a porous catalyst layer formed on the upper layer of the second catalyst layer can be caused to secondarily function. Therefore, the second catalyst layer can exhibit high exhaust gas purification capacity.

As a metal catalyst contained in the second catalyst layer, a three-way catalyst, a diesel oxidation catalyst, a $NO_x$ occlusion reduction catalyst, an SCR catalyst, or the like can be preferably used.

As the three-way catalyst, catalytic metal that oxidizes CO and HC and reduces $NO_x$, for example, a platinoid element such as platinum (Pt), palladium (Pd), rhodium (Rh), ruthenium (Ru), osmium (Os), and iridium (Ir), silver (Ag), gold (Au), or the like is used. Among these substances, any of platinum, palladium, and rhodium having high oxidation activity can be preferably used. In addition, as the diesel oxidation catalyst, any of platinum and palladium can be preferably used. Further, as the $NO_x$ occlusion reduction catalyst, a catalyst that contains platinum, palladium, and rhodium as catalytic metal and contains rare earth such as Ce, alkali earth metal such as Ba and K, and alkali metal as a $NO_x$ occlusion material can be preferably used. In addition, as the SCR catalyst, an SCR catalyst (for example, transition metal ion-exchanged zeolite carrying transition metal (such as Cu and Fe)) that reduces $NO_x$ with $NH_3$ as a reducing agent, an SCR catalyst (for example alumina carrying Ag) that reduces $NO_x$ with HC as a reducing agent, or the like can be preferably used.

Hereinafter, a description will be given of some examination examples according to the present invention, but will not intend to limit the present invention to the examination examples.

First Examination

I. Formation of Catalyst Layers

Example 1

First, a honeycomb base (made of SiC, having a cell number of 300 cpsi, and having a partition wall thickness of 12 mil) manufactured by NGK Insulators, Ltd. was prepared as a base.

Next, a solution in which a dinitrodiammine platinum nitric acid solution and a palladium nitrate solution were mixed together was impregnated with needle $Al_2O_3$ powder (having an average fiber diameter φ of 0.5 μm and an average fiber length L of 6 μm) serving as a carrier and then dried and burned to obtain Pt/Pd-carrying $Al_2O_3$ powder serving as a carrier.

The obtained Pt/Pd-carrying $Al_2O_3$ powder, an $Al_2O_3$ sol (having an $Al_2O_3$ content of 7%) serving as a binder, and pure water serving as a solvent were mixed together at a mass ratio (g) of 200:1000:400 and subjected to wet milling to prepare slurry. Melamine resin beads (having an average particle size of 5 μm) serving as a pore shaping agent, a surfactant (RHEODOL 430V (manufactured by Kao Corporation)), and carboxymethyl cellulose (CMC) serving as a thickening agent were sequentially added to the slurry and then stirred to obtain catalyst layer forming slurry. The catalyst layer forming slurry was input from the end of the base on the exhaust-gas inflow side into input-side cells and then suctioned from the end thereof on the exhaust-gas outflow side, whereby the slurry was applied onto the wall surface of the partition wall on the exhaust-gas inflow side over a longitudinal 100% region in the extending direction of the partition wall according to an input method. The slurry was dried at 150° C. and then burned at 500° C. to burn out the component of the pore shaping agent and form a catalyst layer on the surface of the partition wall (atop the partition wall) on the exhaust-gas inflow side. Note that the coating amount of the slurry was adjusted so that the formed catalyst layer became 15 g/L per base capacity.

Example 2

Except for using melamine resin beads (having an average particle size of 10 μm) as a pore shaping agent, a catalyst layer was formed on the surface of the partition wall on the exhaust-gas inflow side in the same manner as Example 1.

Example 3

First, a honeycomb base (made of SiC, having a cell number of 300 cpsi, and having a partition wall thickness of 12 mil) manufactured by NGK Insulators, Ltd. was prepared as a base.

Next, a solution in which a dinitrodiammine platinum nitric acid solution and a palladium nitrate solution were mixed together was impregnated with needle $TiO_2$ powder (having an average fiber diameter φ of 0.2 μm and an average fiber length L of 3 μm) serving as a carrier and then dried and burned to obtain Pt/Pd-carrying $TiO_2$ powder serving as a carrier.

The obtained Pt/Pd-carrying $TiO_2$ powder, a $TiO_2$ sol (having a $TiO_2$ content of 6%) serving as a binder, and pure water serving as a solvent were mixed together at a mass ratio (g) of 200:1200:200 and subjected to wet milling to prepare slurry. Melamine resin beads (having an average particle size of 2 μm) serving as a pore shaping agent, a surfactant (RHEODOL 430V (manufactured by Kao Corporation)), and carboxymethyl cellulose (CMC) serving as a thickening agent were sequentially added to the slurry and then stirred to obtain catalyst layer forming slurry. The catalyst layer forming slurry was input from the end of the base on the exhaust-gas inflow side into the input-side cells and then suctioned from the end thereof on the exhaust-gas outflow side, whereby the slurry was applied onto the wall surface of the partition wall on the exhaust-gas inflow side over a longitudinal 100% region in the extending direction of the partition wall according to an input method. The slurry was dried at 150° C. and then burned at 500° C. to burn out the component of the pore shaping agent and form a catalyst layer on the surface of the partition wall on the exhaust-gas inflow side. Note that the coating amount of the slurry was adjusted so that the formed catalyst layer became 20 g/L per base capacity.

Example 4

Except for using melamine resin beads (having an average particle size of 5 μm) as a pore shaping agent, a catalyst layer was formed on the surface of the partition wall on the exhaust-gas inflow side in the same manner as Example 3.

Example 5

Except for using melamine resin beads (having an average particle size of 10 μm) as a pore shaping agent, a catalyst layer was formed on the surface of the partition wall on the exhaust-gas inflow side in the same manner as Example 3.

Example 6

Except for using needle $TiO_2$ powder (having an average fiber diameter φ of 0.3 μm and an average fiber length L of 5 μm) as a carrier, a catalyst layer was formed on the surface of the partition wall on the exhaust-gas inflow side in the same manner as Example 5.

Example 7

Except for using particulate $Al_2O_3$ powder (milled so as to have an average particle size of 2 μm by wet milling) as a carrier, a catalyst layer was formed on the surface of the partition wall on the exhaust-gas inflow side in the same manner as Example 1.

Example 8

Except for using particulate $TiO_2$ powder (milled so as to have an average particle size of 2 μm by wet milling) as a carrier, a catalyst layer was formed on the surface of the partition wall on the exhaust-gas inflow side in the same manner as Example 4.

Example 9

First, a honeycomb base (made of SiC, having a cell number of 300 cpsi, and having a partition wall thickness of 12 mil) manufactured by NGK Insulators, Ltd. was prepared as a base.

Next, a solution in which a dinitrodiammine platinum nitric acid solution and a palladium nitrate solution were mixed together was impregnated with particulate CeZr powder (milled so as to have an average particle size of 2 μm by wet milling) serving as a carrier and then dried and burned to obtain Pt/Pd-carrying CeZr powder serving as a carrier.

The obtained Pt/Pd-carrying CeZr powder, a $ZrO_2$ sol (having a $ZrO_2$ content of 30%) serving as a binder, and pure water serving as a solvent were mixed together at a mass ratio (g) of 200:240:1160 and subjected to wet milling to prepare slurry. Melamine resin beads (having an average particle size of 5 μm) serving as a pore shaping agent, a surfactant (RHEODOL 430V (manufactured by Kao Corporation)), and carboxymethyl cellulose (CMC) serving as a thickening agent were sequentially added to the slurry and then stirred to obtain catalyst layer forming slurry. The catalyst layer forming slurry was input from the end of the base on the exhaust-gas inflow side into the input-side cells and then suctioned from the end thereof on the exhaust-gas outflow side, whereby the slurry was applied onto the wall surface of the partition wall on the exhaust-gas inflow side over a longitudinal 100% region in the extending direction of the partition wall according to an input method. The slurry was dried at 150° C. and then burned at 500° C. to burn out the component of the pore shaping agent and form a catalyst layer on the surface of the partition wall on the exhaust-gas inflow side. Note that the coating amount of the slurry was adjusted so that the formed catalyst layer became 20 g/L per base capacity.

Example 10

Except for using melamine resin beads (having an average particle size of 10 μm) as a pore shaping agent, a catalyst layer was formed on the surface of the partition wall on the exhaust-gas inflow side in the same manner as Example 9.

Example 11

Except for using starch (having an average particle size of 2 μm) as a pore shaping agent, a catalyst layer was formed on the surface of the partition wall on the exhaust-gas inflow side in the same manner as Example 1.

Example 12

Except for using starch (having an average particle size of 5 μm) as a pore shaping agent, a catalyst layer was formed on the surface of the partition wall on the exhaust-gas inflow side in the same manner as Example 1.

Example 13

Except for using starch (having an average particle size of 10 μm) as a pore shaping agent, a catalyst layer was formed on the surface of the partition wall on the exhaust-gas inflow side in the same manner as Example 1.

Example 14

Except for using polymethyl methacrylate (PMMA) resin (having an average particle size of 2 μm) as a pore shaping agent, a catalyst layer was formed on the surface of the partition wall on the exhaust-gas inflow side in the same manner as Example 1.

Example 15

Except for using a polymethyl methacrylate (PMMA) resin (having an average particle size of 5 μm) as a pore shaping agent, a catalyst layer was formed on the surface of the partition wall on the exhaust-gas inflow side in the same manner as Example 1.

Example 16

Except for using a polymethyl methacrylate (PMMA) resin (having an average particle size of 10 μm) as a pore shaping agent, a catalyst layer was formed on the surface of the partition wall on the exhaust-gas inflow side in the same manner as Example 1.

Reference Example 1

Except for using citric acid (foaming agent) as a pore shaping agent, a catalyst layer was formed on the surface of the partition wall on an exhaust-gas inflow side in the same manner as Example 3.

Reference Example 2

Except for not using a thickening agent (CMC) and employing an immersion method for immersing a base in catalyst layer forming slurry, a catalyst layer was formed inside the partition wall in the same manner as Reference Example 1.

Reference Example 3

Except for adjusting the coating amount of slurry so that a formed catalyst layer became 50 g/L per base capacity, the catalyst layer was formed inside the partition wall (inside the pores) in the same manner as Reference Example 2.

Reference Example 4

Except for using melamine resin beads (having an average particle size of 2 μm) as a pore shaping agent, a catalyst layer was formed inside the partition wall (inside the pores) in the same manner as Reference Example 2.

Reference Example 5

Except for adjusting the coating amount of slurry so that the formed catalyst layer became 50 g/L per base capacity, the catalyst layer was formed inside the partition wall (inside the pores) in the same manner as Reference Example 4.

II. SEM Observation

The cross sections and the surfaces of the catalyst layers according to Examples 1 to 16 and Reference Examples 1 to 5 were observed with an electron microscope (SEM) for analysis. Representative observation results are shown in FIGS. 4(a) to 4(d) to FIG. 9.

FIGS. 4(a) to 4(d) are SEM observation images according to Example 1. Specifically, FIG. 4(a) is a cross-section SEM observation image (at a magnification of 500 times) of the catalyst layer, and FIG. 4(b) is a cross-section SEM observation image (at a magnification of 2000 times) of the catalyst layer. In addition, FIG. 4(c) is a surface SEM observation image (at a magnification of 500 times) of the catalyst layer, and FIG. 4(d) is a surface SEM observation image (at a magnification of 2000 times) of the catalyst layer.

Figure 5:
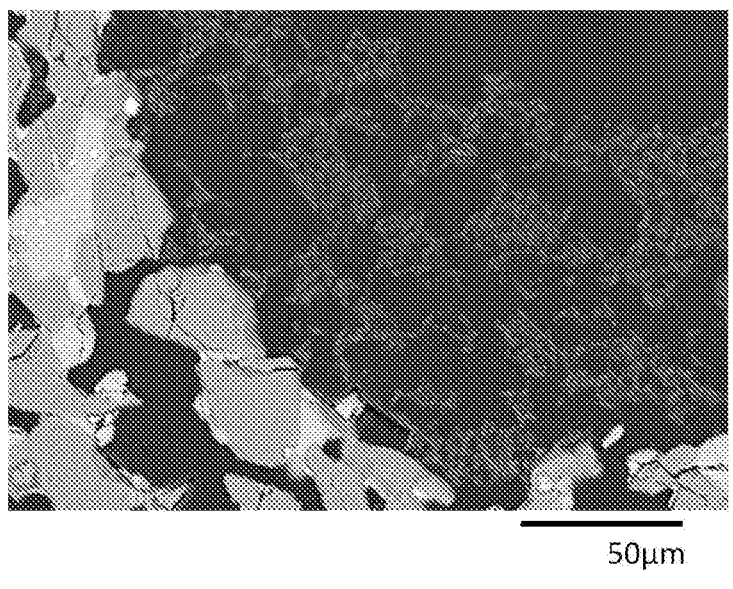
FIG. 5 is a cross-section SEM observation image according to Example 2.

FIG. 5 is a cross-section SEM observation image (at a magnification of 600 times) of the catalyst layer according to Example 2.

Figure 6:
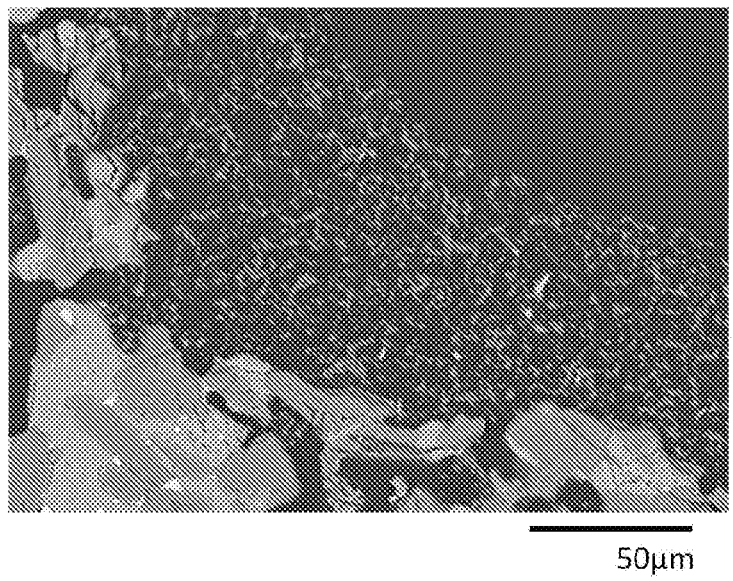
FIG. 6 is a cross-section SEM observation image according to Example 3.

FIG. 6 is a cross-section SEM observation image (at a magnification of 600 times) of the catalyst layer according to Example 3.

FIGS. 7(a) and 7(b) are SEM observation images according to Reference Example 1, FIG. 7(a) being a cross-section SEM observation image (at a magnification of 600 times) of the catalyst layer, FIG. 7(b) being a surface SEM observation image (at a magnification of 500 times) of the catalyst layer.

FIGS. 8(a) and 8(b) are SEM observation images according to Reference Example 2. Specifically, FIG. 8(a) is a cross-section SEM observation image (at a magnification of 600 times) of the catalyst layer, and FIG. 8(b) is a surface SEM observation image (at a magnification of 500 times) of the catalyst layer.

Figure 9:
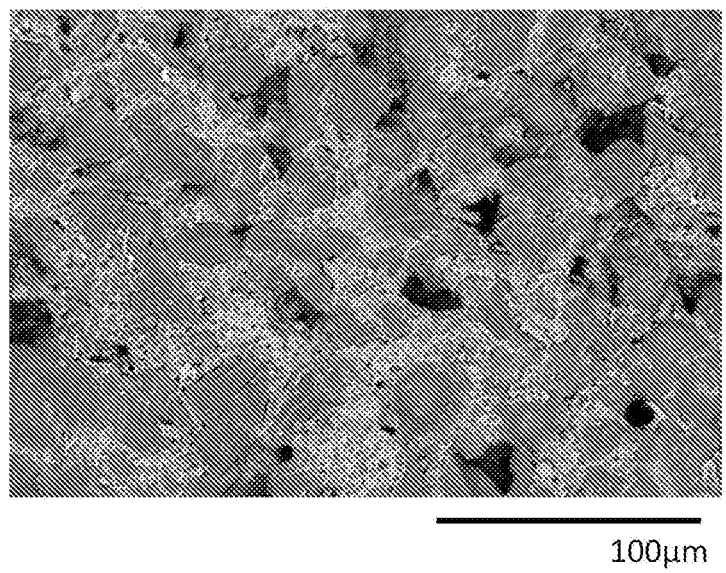
FIG. 9 is a surface SEM observation image of a catalyst layer according to Reference Example 3.

FIG. 9 is a surface SEM observation image (at a magnification of 500 times) of the catalyst layer according to Reference Example 3.

As shown in FIGS. 4(a) to 4(d) to FIG. 6, the binary pore structure was formed by the two types of pores in Examples 1 to 16. That is, the catalyst layers in Examples 1 to 16 had the relatively large first pores defined by the frameworks of the catalyst layers and the relatively small second pores formed inside the frameworks. In addition, the specific observation of the second pores reveals that needle materials used as carriers were connected to each other to form networks, whereby pores (having a size less than 1 μm) smaller than the first pores were distributed in the frameworks of the catalyst layers as shown in FIGS. 4(a) to 4(d), or the like.

On the other hand, as shown in FIG. 7(a), the formation of a clear binary pore structure was not confirmed in the catalyst layer in Reference Example 1. It appears that this is because an appropriate pore shaping agent was not used in the catalyst layer forming slurry. In addition, as shown in FIG. 8(a), the formation of the catalyst layers on the partition walls were not confirmed in Reference Examples 2 to 5. Moreover, as shown in FIGS. 7(b), 8(b), and 9, the catalyst layers formed inside the partition walls in Reference Examples 2 to 5 were relatively densely formed (high density) and the pores were small and few compared with, for example, FIG. 4(c) or the like according to Example 1.

III. Analysis (1) of SEM Observation Images

Using the cross-section SEM observation images (at a magnification of 600 times) of the catalyst layers, the ratios (area %) of the whole porosities occupied in the whole catalyst layers and the ratios (area %) of the porosities of large pores (pores having a circle equivalent diameter greater than 5 μm) occupied in the catalyst layers were calculated. Results are shown in Table 1. Note that a calculation method is described above.

As a representative example, SEM observation and analysis results according to Example 1 are shown in FIGS. 10(a) to 10(c). FIG. 10(a) is a cross-section SEM observation image (at a magnification of 600 times) of the catalyst layer in Example 1 used for analysis. FIG. 10(b) shows the parts of pores subjected to image processing. FIG. 10(c) shows the parts of large pores subjected to the image processing.

As shown in Table 1, the catalyst layers had a high porosity Va of 70% or more (for example, about 70 to 85%) in Examples 1 to 16. In addition, porosities Vb of the large pores (the pores having a circle equivalent diameter greater than 5 μm) occupied 45% or more (for example, about 45 to 85%) of the whole catalyst layers. Moreover, the ratios of Vb to Va (Vb/Va) were 60% or more (for example, 60 to 98%) in Examples 1 to 16.

On the other hand, the catalyst layer had a porosity Va of about 23% only in Reference Example 1. In addition, an occupied ratio Vb of the large pores (pores having a circle equivalent diameter greater than 5 μm) was less than 1% of the whole catalyst layer in Reference Example 1. Note that measurements were not allowed in Reference Examples 2 to 5 since only the parts of the catalyst layers could not be extracted due to the formation of the catalyst layers inside the partition walls.

IV. Analysis (2) of SEM Observation Images

Using the cross-section SEM observation images (at a magnification of 600 times) of the catalyst layers, the number of divisions per unit cross-sectional area of the catalyst layers (the number of divisions/0.01 mm²) and the average thicknesses (μm) of the frameworks were calculated. Image processing was performed under N=5 for each of the Examples, and obtained values were averaged. Results are shown in Table 1. Note that a calculation method is described above. In addition, "the number of divisions" indicates the number of divisions per unit cross-sectional area (0.01 mm²) of the catalyst layers. It appears that the larger the value of the number of divisions, the more the pores inside the catalyst layers communicate with each other.

As described above, the catalyst layers have the binary pore structure, and the pores dispersed in the catalyst layers are connected to each other in Examples 1 to 16. Therefore, as shown in Table 1, the frameworks were divided at any cross section, and the number of divisions was large, i.e., about 30 to 180 per 0.01 mm² in Examples 1 to 16. In addition, the average thicknesses of the frameworks were also kept at 4 μm or less (for example, about 1 to 4 μm) in Examples 1 to 16.

On the other hand, the framework had almost no divided parts in Reference Example 1 in which the binary pore structure was not confirmed, and thus the number of divisions was less than 2. In addition, the framework had an overwhelmingly large average thickness of 30 μm or more in Reference Example 1. Note that measurements were not allowed in Reference Examples 2 to 5 since the catalyst layers were formed inside the partition walls.

V. Analysis (3) of SEM Observation Images

Using the surface SEM observation images of the frameworks of the catalyst layers, the surface opening ratios (area %) and the pore sizes (μm) of the frameworks were calculated. Results are shown in Table 1. Note that a calculation method is described above. In addition, "P5" and "P95" in the columns of the pore sizes indicate a pore size corresponding to a cumulative 5% pore size from a small pore side and a pore size corresponding to a cumulative 95% pore size from the small pore side, respectively.

Figure 11:
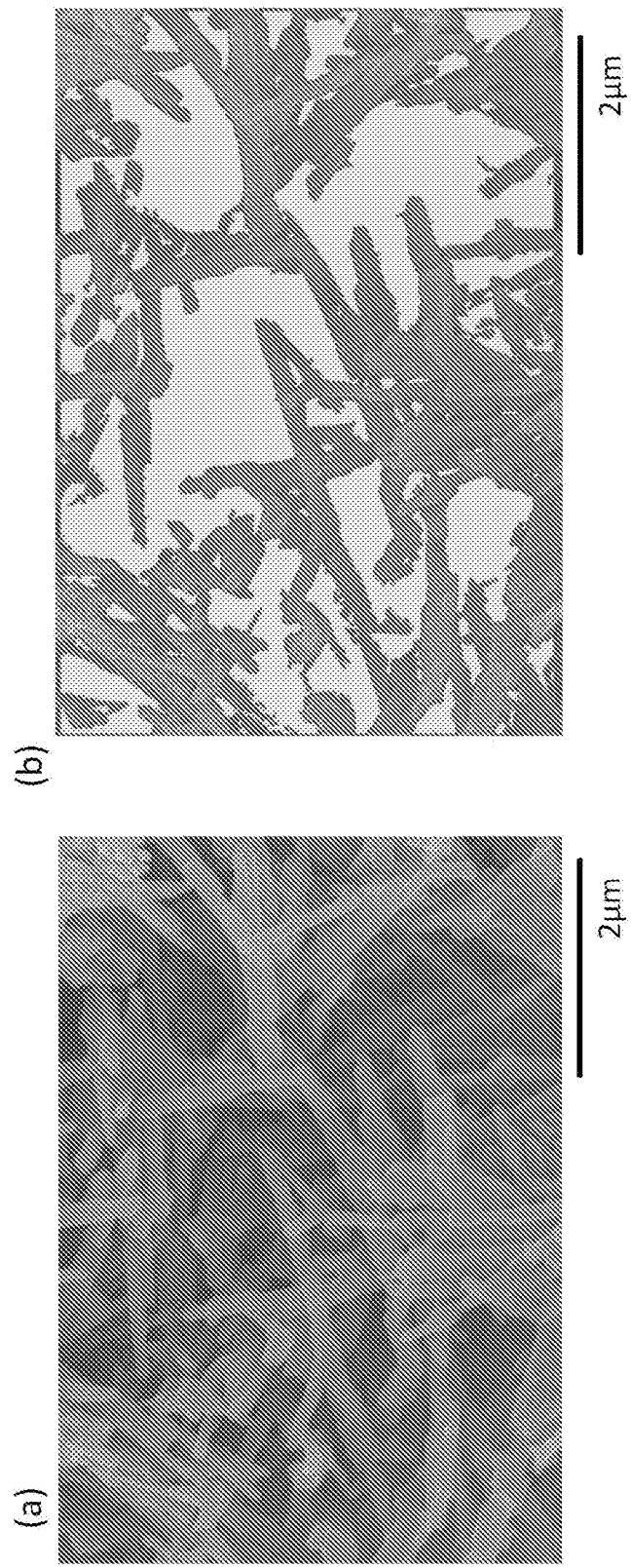
FIGS. 11(a) and 11(b) are explanatory views for describing a method for calculating a surface opening ratio from a surface SEM observation image of the framework of a catalyst layer, FIG. 11(a) being a surface SEM observation image (at a magnification of 20,000 times) of the framework of the catalyst layer of Example 1 used for analysis, FIG. 11(b) being an image showing the parts of surface openings after image processing.

As a representative example, SEM observation and analysis results according to Example 1 are shown in FIGS. 11(a) and 11(b). FIG. 11(a) is a surface SEM observation image (at a magnification of 20000 times) of the framework of the catalyst layer in Example 1 used for analysis. FIG. 11(b) shows the parts of surface openings after image processing.

As shown in Table 1, the frameworks had a high surface opening ratio of about 25 to 55% in Examples 1 to 16. In addition, the frameworks had a pore size of about 0.02 to 4 μm. Note that measurements were not allowed in Reference Examples 2 and 4.

VI. Measurement of Mercury Porosimeter

About the manufactured exhaust gas purification filter, a pore distribution was measured with a mercury porosimeter and compared with a pore distribution based on only the base. An example of an obtained pore distribution curve is shown in each of FIGS. 12(a) to 12(e). Note that FIG. 12(a) shows an example in which the results of the base and Example 1 are compared with each other, FIG. 12(b) shows an example in which the results of the base and Example 2 are compared with each other, FIG. 12(c) shows an example in which the results of the base and Example 3 are compared with each other, FIG. 12(d) shows an example in which the results of the base and Example 4 are compared with each other, and FIG. 12(e) shows an example in which the results of the base and Reference Example 1 are compared with each other.

As shown in each of FIGS. 12(a) to 12(d), in Examples 1 to 4 it appears that a large peak was observed when the pore size was in the range of 1 μm or more and less than m, and that a pore volume obtained when the pore size was in the range of 1 μm or more and less than 10 μm was increased compared with that of the base. From a study with the SEM observation images, it appears that the increased pore volume is derived from the first pores defined by the frameworks of the catalyst layers.

Figure 12:
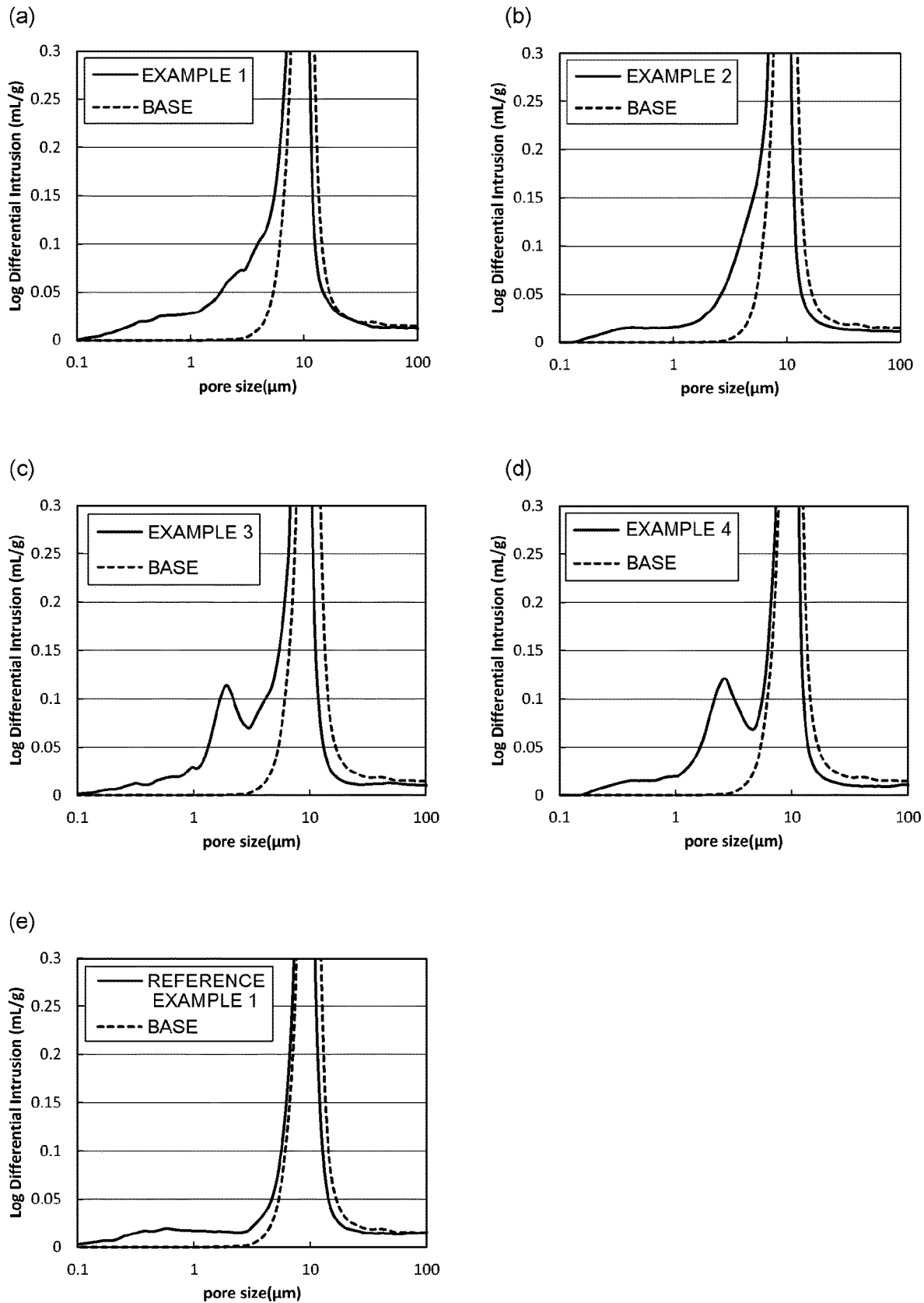
FIGS. 12(a) to 12(e) are pore distribution curves measured by a mercury porosimeter, FIG. 12(a) showing an example in which the results of a base and Example 1 are compared with each other, FIG. 12(b) showing an example in which the results of the base and Example 2 are compared with each other, FIG. 12(c) showing an example in which the results of the base and Example 3 are compared with each other, FIG. 12(d) showing an example in which the results of the base and Example 4 are compared with each other, FIG. 12(e) showing an example in which the results of the base and Reference Example 1 are compared with each other.

In addition, in Example 1 shown in FIG. 12(a), a broad peak was observed when the pore size was in the range of 0.5 μm or more and less than 1 μm. From a study with the SEM observation image, it appears that the peak is derived from the second pores formed when the needle materials are connected to each other inside the framework of the catalyst layer to form a network.

On the other hand, as shown in FIG. 12(e), a clear peak was not confirmed even with analysis software when the pore size was in the range of 1 μm or more and less than 10 μm in Reference Example 1.

In addition, the pore volumes of the catalyst layers were calculated from differences with the pore volume of the base. Here, differences in pore volume when the pore size was in the range of 1 μm or more and less than 10 μm were described as "pore volumes V1 of first pore peaks," and differences in pore volume between the pore volumes when the pore size was in the range of 0.5 μm or more and less than 1 m were described as "pore volumes V2 of second pore peaks." Results are shown in Table 1.

As shown in Table 1, compared with Reference Examples 1 to 5, the pore volumes V1 of the first pore peaks were relatively large and the ratios of the pore volumes V1 of the first pore peaks to the pore volumes V2 of the second pore peaks (V1/V2) were also large, i.e., four or more (for example, four to 20) in Examples 1 to 16. On the other hand, V1/V2 was less than four in Reference Examples 1 to 5.

TABLE 1

Figure 4:
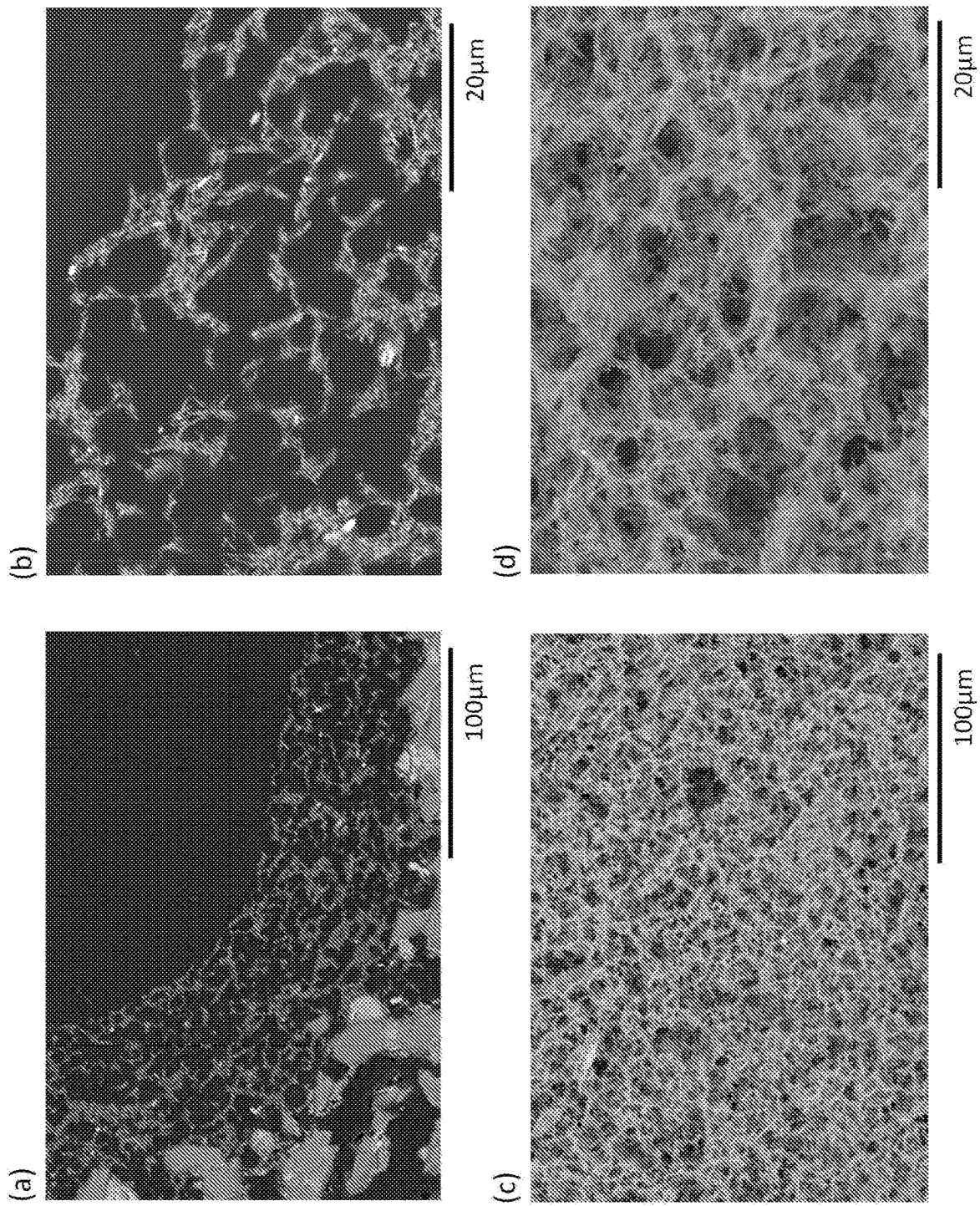
FIGS. 4(a) to 4(d) are SEM observation images according to Example 1, FIGS. 4(a) and 4(b) being cross-section SEM observation images of a catalyst layer, FIGS. 4(c) and 4(d) being surface SEM observation images of the catalyst layer.

| | Arrangement of Catalyst Layer | SEM Observation Image | Catalyst Layer Porosity | | | Catalyst Layer Framework | | | | |
|---|---|---|---|---|---|---|---|---|---|---|
| | | | | | | | Surface | | | |
| | | | Porosity Va (%) | Large Pore Porosity Vb (%) | Vb/Va (%) | The Number of Divisions (0.01 mm$^2$) | Average Thickness (mm) | Opening Ratio (%) | Pore Size P5 (mm) | Pore Size P95 (mm) |
| Example 1 | On wall | FIG. 4 | 71.01 | 50.04 | 70.5 | 82.8 | 2.11 | 54.1 | 0.0396 | 3.50 |
| Example 2 | On wall | FIG. 5 | 79.71 | 51.40 | 64.5 | 30.8 | 3.22 | 51.6 | 0.0446 | 3.74 |
| Example 3 | On wall | FIG. 6 | 77.36 | 46.86 | 60.6 | 173.9 | 1.19 | 32.7 | 0.0364 | 1.58 |
| Example 4 | On wall | — | 73.12 | 52.47 | 71.8 | 96.9 | 1.72 | 41.3 | 0.0367 | 2.18 |
| Example 5 | On wall | — | 82.82 | 80.45 | 97.1 | 66.6 | 1.88 | 34.3 | 0.0368 | 1.53 |
| Example 6 | On wall | — | 78.67 | 70.36 | 89.4 | 119.9 | 1.19 | 52.5 | 0.0366 | 2.54 |
| Example 7 | On wall | — | 70.88 | 49.21 | 69.4 | 75.6 | 2.56 | 30.2 | 0.0287 | 2.24 |
| Example 8 | On wall | — | 71.18 | 53.56 | 75.2 | 94.3 | 2.19 | 33.3 | 0.0297 | 2.11 |
| Example 9 | On wall | — | 71.61 | 55.93 | 78.1 | 104.1 | 2.04 | 28.1 | 0.0313 | 3.09 |
| Example 10 | On wall | — | 79.36 | 52.57 | 66.2 | 53.7 | 3.61 | 27.9 | 0.0305 | 2.91 |
| Example 11 | On wall | — | 78.01 | 47.97 | 61.5 | 151.9 | 1.22 | 30.4 | 0.0376 | 2.26 |
| Example 12 | On wall | — | 72.15 | 50.46 | 69.9 | 92.5 | 1.84 | 49.5 | 0.0392 | 2.12 |
| Example 13 | On wall | — | 80.94 | 71.29 | 88.1 | 42.2 | 2.00 | 50.8 | 0.0371 | 2.33 |
| Example 14 | On wall | — | 78.23 | 47.12 | 60.2 | 164.4 | 1.18 | 39.2 | 0.0382 | 1.94 |
| Example 15 | On wall | — | 71.38 | 53.43 | 74.9 | 95.9 | 1.79 | 44.6 | 0.0385 | 2.15 |
| Example 16 | On wall | — | 78.44 | 69.91 | 89.1 | 38.7 | 1.97 | 40.3 | 0.039 | 1.91 |
| Reference Example 1 | On wall | FIG. 7 | 22.93 | 0.71 | 3.1 | 1.7 | 31.45 | 33.5 | 0.0300 | 1.41 |
| Reference Example 2 | Inside pore | FIG. 8 | ND | ND | ND | ND | ND | ND | ND | ND |
| Reference Example 3 | Inside pore | FIG. 9 | ND | ND | ND | ND | ND | 30.9 | 0.0361 | 1.53 |
| Reference Example 4 | Inside pore | — | ND | ND | ND | ND | ND | ND | ND | ND |
| Reference Example 5 | Inside pore | — | ND | ND | ND | ND | ND | 35.3 | 0.0364 | 1.42 |

| | Pore Volume Based on Mercury Porosimet | | | Evaluation Results | | | | Regeneration |
|---|---|---|---|---|---|---|---|---|
| | First Pore Peak V1 (cm$^3$/g) | Second Pore Peak V2 (cm$^3$/g) | Volume Ratio (V1/V2) | Product Presssure Loss (Relative Value) | PM Collection Pressure Loss (kPa/(g/sec)) | Pressure Loss Hysteresis (g/unit) | The Number of Exhausted PM Particles (/km) | Ratio at 400° C. (%) |
| Example 1 | 0.0634 | 0.0150 | 4.2 | 1.29 | 0.0919 | 1.6 | 1.12E+10 | 41 |
| Example 2 | 0.0604 | 0.0139 | 4.3 | 1.27 | 0.0940 | 2.1 | 1.62E+10 | 43 |
| Example 3 | 0.0762 | 0.0112 | 6.8 | 1.59 | 0.0839 | 1.4 | 1.12E+10 | 38 |
| Example 4 | 0.0595 | 0.0098 | 6.1 | 1.33 | 0.0851 | 1.5 | 1.17E+10 | 39 |
| Example 5 | 0.0560 | 0.0098 | 5.7 | 1.31 | 0.0844 | 1.6 | 1.40E+10 | 45 |
| Example 6 | 0.0414 | 0.0021 | 19.7 | 1.19 | 0.0911 | 24 | 1.48E+10 | 42 |
| Example 7 | 0.0322 | 0.0040 | 8.1 | 1.48 | 0.0850 | 1.4 | 1.19E+10 | 37 |
| Example 8 | 0.0348 | 0.0050 | 7.0 | 1.37 | 0.0849 | 1.7 | 1.20E+10 | 39 |
| Example 9 | 0.0353 | 0.0050 | 7.1 | 1.40 | 0.0863 | 1.5 | 1.28E+10 | 45 |
| Example 10 | 0.0331 | 0.0040 | 8.3 | 1.35 | 0.0926 | 2.2 | 1.65E+10 | 46 |
| Example 11 | 0.0736 | 0.0104 | 7.1 | 1.48 | 0.0896 | 2.2 | 1.44E+10 | 38 |
| Example 12 | 0.0603 | 0.0123 | 4.9 | 1.34 | 0.0848 | 2.4 | 1.59E+10 | 40 |
| Example 13 | 0.0579 | 0.0122 | 4.7 | 1.28 | 0.0852 | 2.4 | 1.48E+10 | 41 |
| Example 14 | 0.0747 | 0.0114 | 6.6 | 1.56 | 0.0905 | 1.5 | 1.34E+10 | 37 |
| Example 15 | 0.0593 | 0.0115 | 5.2 | 1.38 | 0.0867 | 1.6 | 1.25E+10 | 38 |
| Example 16 | 0.0572 | 0.0102 | 5.6 | 1.22 | 0.0856 | 1.8 | 1.68E+10 | 40 |
| Reference Example 1 | 0.0215 | 0.0123 | 1.7 | 1.99 | 0.2381 | 1.4 | 1.16E+10 | 40 |
| Reference Example 2 | 0.0145 | 0.0046 | 3.2 | 1.16 | 0.1223 | 7.6 | 4.96E+11 | 11 |
| Reference Example 3 | 0.0405 | 0.0262 | 1.5 | 1.72 | 0.1475 | 5.3 | 4.06E+11 | 32 |
| Reference Example 4 | 0.0161 | 0.0045 | 3.6 | 1.15 | 0.1222 | 7.7 | 5.22E+11 | 9 |
| Reference Example 5 | 0.0719 | 0.0250 | 2.9 | 1.69 | 0.1460 | 5.1 | 3.51E+11 | 30 |

VII. Evaluation of Product Pressure Losses

About the manufactured exhaust gas purification filter, pressure losses (product pressure losses) after the formation of the catalyst layers were measured and then standardized with the pressure loss of the base itself. Results are shown in Table 1.

As shown in Table 1, the exhaust gas purification filter had a low pressure loss of 1.6 times or less of that the base in Examples 1 to 16. It appears that this is because the catalyst layers in Examples 1 to 16 have structural properties in which the catalyst layers formed on the partition wall of the cells are high in communication (excellent in permeability). In addition, the pressure losses were kept low in Reference Examples 2 and 4 as well. It appears that this is because the catalyst layers distributed inside the pores of the base were relatively small, which resulted in less influence on the gas flow paths of the pores of the base.

On the other hand, the pressure losses were nearly twice as that of the base in Reference Examples 1, 3, and 5. It appears that this is because the pores of the base were structurally sealed with the catalyst layers having low communication on the partition wall of the cells, which resulted in the high pressure losses in Reference Example 1. In addition, it appears that this is because the gas flow paths of the pores of the base were narrowed with the distribution of large amounts of the catalyst layer inside the pores of the base, which resulted in the high pressure losses in Reference Examples 3 and 5.

VIII. Evaluation of PM Collection Pressure Losses

About the manufactured exhaust gas purification filter, PM collection pressure losses (kPa/(g/sec)) were measured. Specifically, PM was collected with the exhaust gas purification filter installed in an engine bench, and pressure losses at a point at which the PM was collected by 5 g were evaluated. The pressure losses were standardized with an intake air amount. Results are shown in Table 1.

As shown in Table 1, the exhaust gas purification filter had a low PM collection pressure loss of 0.1 kPa/(g/sec) or less in Examples 1 to 16. It appears that this is because the collection of PM was suppressed inside the pores of the base with the catalyst layer functioning as filtration layers, which resulted in the suppression of a rapid increase in the pressure losses at initial PM collection.

On the other hand, the PM collection pressure losses were higher than 0.1 kPa/(g/sec) in Reference Examples 1 to 5. It appears that this is because a rapid increase in the pressure loss at initial PM collection was reduced with the arrangement of the catalyst layer on the partition wall of the cells but the PM collection pressure loss became high since an original product pressure loss was high in Reference Example 1. In addition, it appears that this is because the pressure losses were rapidly increased at initial PM collection since PM was collected inside the pores of the base, which resulted in an increase in the PM collection pressure loss in Reference Examples 2 to 5. Moreover, in Reference Examples 3 and 5, the product pressure losses were relatively high compared with Reference Examples 2 and 4, and thus PM collection pressure losses became higher than those of Reference Examples 2 and 4. Results are shown in Table 1.

IX. Evaluation of Pressure Loss Hysteresis

About the manufactured exhaust gas purification filter, pressure loss hysteresis was evaluated by a bench test. Specifically, with the exhaust gas purification filter installed in an engine bench, an initial collection pressure loss obtained when the collection of PM was started from a state before the use (before the collection of the PM) and a post-regeneration collection pressure loss obtained when the collection of the PM was started again from a state in which the PM remained by 5 g after regeneration processing were measured. Then, the values of the initial collection pressure loss and the post-regeneration collection pressure loss were compared with each other, and a difference in PM collection amount when the values of the pressure losses were the same was regarded as pressure loss hysteresis (g/unit). Rresults are shown in Table 1.

As shown in Table 1, the catalyst layers had low pressure loss hysteresis of 2.5 (g/unit) or less in Examples 1 to 16. It appears that this is because the catalyst layers functioned as filtration layers to suppress the collection of PM inside the pores of the base.

In addition, since the catalyst layers had low pressure loss hysteresis of 1.4 (g/unit) but had a higher absolute value of the PM collection pressure loss compared with Examples 1 to 16 in Reference Example 1, fuel economy was assumed to become poor.

On the other hand, the catalyst layers had high pressure loss hysteresis of 5 (g/unit) or more in Reference Examples 2 to 5. In Reference Examples 2 and 4, PM is collected at two spots, i.e., inside the pores of the base and the surface layer of the partition wall of the base since the PM intrudes into the pores of the base. For this reason, it appears that pressure loss hysteresis occurred. In addition, the catalyst layers in Reference Examples 3 and 5 had higher pressure loss hysteresis than those of Examples 1 to 16 but had lower pressure loss hysteresis than those of Reference Examples 2 and 4. It appears that this is because the collection amount of PM inside the pores of the base was reduced since the gas flow paths of the pores of the base were narrowed by the catalyst layers.

X. Evaluation of PM Collection Performance

About the manufactured exhaust gas purification filter, PM collection performance was evaluated by a vehicle test. Specifically, with the exhaust gas purification filter installed on the exhaust path of a vehicle, the number of exhausted PM particles (particle number/km) obtained when the vehicle traveled under an NEDC mode was evaluated. Results are shown in Table 1.

As shown in Table 1, in Examples 1 to 16, the exhaust gas purification filter exhausted a relatively small number of exhausted PM particles compared with Reference Examples 2 to 5 and was excellent in the PM collection performance. It appears that this is because the catalyst layers arranged on the partition wall of the cells functioned as filtration layers to exhibit high PM collection efficiency. In addition, the exhaust gas purification filter having the catalyst layer on the partition wall in Reference Example 1 also exhausted a small number of PM particles.

On the other hand, in Reference Examples 2 to 5, the exhaust gas purification filter exhausted a relatively large number of PM particles and was low in PM collection performance. It appears that this is because PM collection efficiency immediately after the start of PM collection was poor in Reference Examples 2 and 4. In addition, in Reference Examples 3 and 5, the pores of the surface of the base became small since the coating amounts of the catalyst layers were large. As a result, the exhaust gas purification filter exhausted a small number of PM particles compared with Reference Examples 2 and 4 but did not produce the same effects as those of Examples 1 to 16.

XI. Evaluation of PM Burning Quality

About the manufactured exhaust gas purification filter, PM burning quality was evaluated by a bench test. Specifically, with the exhaust gas purification filter installed in an engine bench, PM was collected by 5 g/L. Then, 1-hour regeneration processing was performed at a low temperature (400° C.), and a regeneration ratio (%) was calculated from PM collection amounts before and after the regeneration processing. Results are shown in Table 1.

As shown in Table 1, the exhaust gas purification filter had high PM burning quality in Examples 1 to 16. It appears that this is because, for instance, the contact points between PM and the metal catalyst were increased with the arrangement of the catalyst layers on the partition wall of the cells or $NO_2$ generated with the oxidation of NO in exhaust gas was highly likely to reach the PM since the catalyst layers are structurally high in communication. In addition, the exhaust gas purification filter having the catalyst layer on the partition wall in Reference Example 1 had high PM burning quality.

On the other hand, the exhaust gas purification filter had low PM burning quality in Reference Examples 2 to 5. It appears that this is because the PM and the metal catalyst were less likely to contact each other since the catalyst was distributed inside the pores of the base in Reference Examples 2 and 4. In addition, in Reference Examples 3 and 5, PM and the metal catalyst were highly likely to contact each other with an increase in the coating amounts of the catalyst layers. Therefore, the PM burning quality of the exhaust gas purification filter in Reference Examples 3 and 5 was improved compared with Reference Examples 2 and 4 but was inferior to Examples 1 to 16.

As described above, the exhaust gas purification filter of the embodiment has the three-dimensional mesh-shaped catalyst layer having the binary pore structure. With the structural properties of the catalyst layer, the exhaust gas purification filter of the embodiment suppresses an increase in pressure loss, reduces pressure loss hysteresis, and is excellent in regeneration controllability. In addition, the exhaust gas purification filter of the embodiment has high PM burning quality and can improve a low-temperature regeneration ratio.

Study on Length of Catalyst Layer

In the embodiment, samples (Examples 17 and 18) having the catalyst layer different in length were manufactured using the catalyst layer forming slurry of Example 1, and the transition of a pressure loss associated with the collection of PM (PM collection pressure loss $\Delta P/Ga$ (kPa/(g/sec))) was measured. Specifically, the catalyst layer was formed in a region 80% of a length in the extending direction of the partition wall in Example 17, and the catalyst layer was formed in a region 90% of the length in the extending direction of the partition wall in Example 18. Results are shown in FIG. 13.

Figure 13:
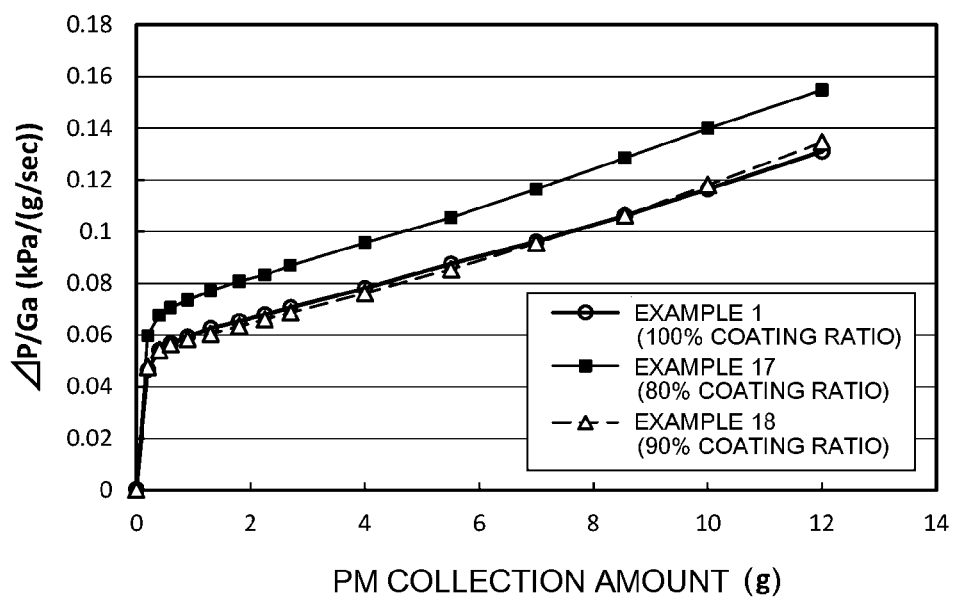
FIG. 13 is a graph showing the relationship between the length of the catalyst layer and a PM collection pressure loss.

As shown in FIG. 13, a PM collection pressure loss was noticeably small when the length of the catalyst layer (the coating ratio of the partition wall) was 90% or more. It appears that this is because the intrusion amount of PM into the pores of the partition wall of the base was reduced, which resulted in the suppression of an increase in pressure loss at the start of PM collection.

Second Examination

I. Formation of Catalyst Layers

Example 19

In this Examination, a honeycomb base made of cordierite (having a cell number of 300 cpsi and a partition wall thickness of 12 mil) was prepared. Then, after a second catalyst layer was formed inside the partition wall of the base, a porous catalyst layer was formed on the surface of the partition wall. Note that in this examination example, the second catalyst layer was provided with two catalyst layers (an Rh catalyst layer and a Pd catalyst layer) containing a three-way catalyst.

Specifically, 40 g of $Al_2O_3$ powder ($\gamma$-$Al_2O_3$) serving as a carrier, rhodium nitrate having an Rh content of 0.2 g, and an appropriate amount of ion-exchanged water were mixed together, and an obtained mixture was dried and burned (at 500° C. for 1 hour) to obtain Rh-carrying $Al_2O_3$ powder. Then, the Rh-carrying $Al_2O_3$ powder, 60 g of an OSC material (ceria-zirconia multiple oxide), and ion-exchanged water were mixed together to prepare Rh catalyst layer slurry.

Next, the prepared Rh catalyst layer slurry was supplied from an end on an exhaust-gas inflow side into the input-side cells of the honeycomb base, suctioned from output-side cells, and then dried. Thus, the Rh catalyst layer having a length 70% of the whole length Lw of the partition wall was formed inside the partition wall contacting the input-side cells. Note that the coating amount of the Rh catalyst layer slurry was adjusted so that the formed Rh catalyst layer became 45 g/L per base capacity. In this examination example, the Pd catalyst layer was next formed. In the formation of the Pd catalyst layer, Pd catalyst layer slurry was prepared in the same procedure as that of the Rh catalyst layer except for using palladium nitrate serving as a Pd source instead of rhodium nitrate serving as an Rh source. Next, the prepared Pd catalyst layer slurry was supplied from the end on the exhaust-gas outflow side into the output-side cells of the honeycomb base, suctioned from the input-side cells, and then dried. Thus, the Pd catalyst layer having a length 50% of the whole length Lw of the partition wall were formed inside the partition wall contacting the output-side cells. Note that the coating amount of the Pd catalyst layer slurry was adjusted so that the formed Pd catalyst layer became 20 g/L per base capacity.

Next, in this examination, a porous catalyst layer was formed on the surface of the partition wall of the base.

Specifically, a solution in which a dinitrodiammine platinum nitric acid solution and a palladium nitrate solution were mixed together was impregnated with needle $TiO_2$ powder (having an average fiber diameter $\varphi$ of 0.2 μm and an average fiber length L of 3 μm) serving as a carrier and then dried and burned to obtain Pt/Pd-carrying $TiO_2$ powder serving as a carrier.

The obtained Pt/Pd-carrying $TiO_2$ powder, a $TiO_2$ sol (having a $TiO_2$ content of 6%) serving as a binder, and pure water serving as a solvent were mixed together at a mass ratio (g) of 200:1200:200 and subjected to wet milling to prepare slurry. Melamine resin beads (having an average particle size of 10 μm) serving as a pore shaping agent, a surfactant (RHEODOL 430V (manufactured by Kao corporation)), and carboxymethyl cellulose (CMC) serving as a thickening agent were sequentially added to the slurry and then stirred to obtain catalyst layer forming slurry.

Then, the catalyst layer forming slurry was input from the end on the exhaust-gas inflow side into the input-side cells and then the output-side cells were suctioned from the end on the exhaust-gas outflow side, whereby the slurry was applied onto the wall surface of the partition wall on the exhaust-gas inflow side over a longitudinal 100% region in the extending direction of the partition wall. The slurry was dried at 150° C. and then burned at 500° C. to burn out the component of the pore shaping agent and form a porous catalyst layer on the surface of the partition wall on the exhaust-gas inflow side. Note that the coating amount of the catalyst layer forming slurry was adjusted so that the formed catalyst layer became 20 g/L per base capacity.

Note that the porous catalyst layer in Example 19 is formed in the same procedure as that of the catalyst layer formed in Example 5 of the first examination. Then, as a result of examining the pore structure of the catalyst layer in Example 19 based on the same methods as those of (II) to (V1) of the first examination such as the observation and analysis of SEM images, it appears that porous catalyst material in Example 19 has the same pore structure as that of the catalyst layer in Example 5 of the first examination.

Reference Example 6

Except for not forming a porous catalyst layer on the surface of the partition wall of a base, an exhaust gas purification filter in which second catalyst layer (an Rh catalyst layer and a Pd catalyst layer) was formed inside the partition wall of the base was manufactured through the same process as that of Example 19.

II. Evaluation of Catalyst Activity of Three-Way Catalyst

A part of the exhaust gas purification filter manufactured in Example 19 and Reference Example 6 was cut out to manufacture an examination segment having a diameter of 3 cm and a length of 5 cm. At this time, the exhaust gas purification filter was cut out in such a manner as to contain both the Rh catalyst layer and the Pd catalyst layer in the manufactured examination segment. Then, the input-side cells and the output-side cells of the manufactured examination segment were alternately sealed to construct a filter having a structure in which gas flowing into the input-side cells was caused to be exhausted from the output-side cells via the partition wall.

Then, the temperature increasing properties of the examination segment manufactured in Example 19 and Reference Example 6 were measured using a model gas activity device, and the catalyst activity of the three-way catalyst (Rh and Pd) contained in the second catalyst layer was evaluated based on the measurement results.

Specifically, model gas having the following composition was supplied into the input-side cells of the examination segment, and the composition of the gas exhausted from the output-side cells was continuously measured while the temperature of the examination segment was increased. Then, the temperature of each of CO, HC, and $NO_x$ contained in the gas exhausted from the output-side cells (50% purification temperature (T50)) was measured in a state in which each of CO, HC, and $NO_x$ was purified by 50%. Measurement results are shown in FIG. 14.

Note that as for hydrocarbon (HC), the 50% purification temperature (T50) of THC (Total Hydrocarbon) was measured.

Figure 14:
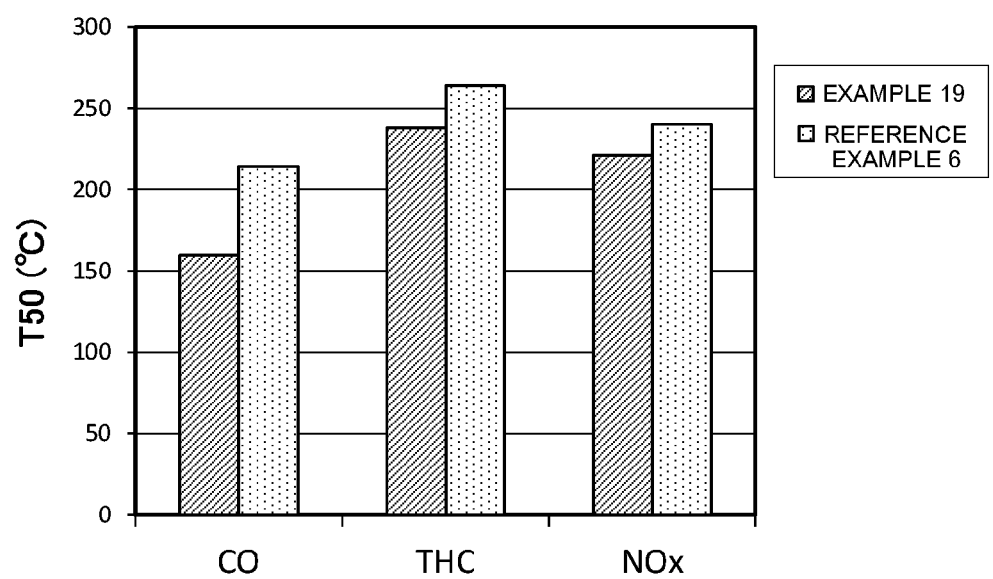
FIG. 14 is a graph showing the measurement results of the 50% purification temperatures (T50) of Example 19 and Reference Example 6.

(Composition of Model Gas)
$C_3H_6$: 800 ppm
$C_3H_8$: 200 ppm
NO: 800 ppm
CO: 0.5%
$CO_2$: 11%
$O_2$: 0.77%
$H_2$: 0.2%
$H_2O$: 10%
$N_2$: balance As shown in FIG. 14, the 50% purification temperature (T50) of Example 19 was lower than that of Reference Example 6 for any of CO, HC, and $NO_x$. From the results, it appears that the catalyst activity of the second catalyst layer formed inside the partition wall is improved with the porous catalyst layer provided on the surface of the partition wall. As a reason for this, first, it appears that a catalyst component carried by the catalyst layer on the surface of the partition wall secondarily functions with respect to the catalyst activity of the three-way catalyst of the second catalyst layer. In addition, it appears that since an effect in which the catalyst layer on the surface of the partition wall collects the PM and the intrusion of the PM into the second catalyst layer is suppressed to allow purification targets (CO, HC, and $NO_x$) to efficiently contact the three-way catalyst is added when the exhaust gas purification filter is actually used in an engine exhaust system, the three-way catalyst activity can be more efficiently exhibited.

The specific examples of the present invention are described above, but are merely given for exemplification only and do not intend to limit the claims. Technologies described in the claims include those obtained by modifying the specific examples described above.

REFERENCE SIGNS LIST

1 Exhaust gas purification device
2 Internal combustion engine
10 Exhaust gas purification filter
11 Base
12 Input-side cell
14 Output-side cell
16 Partition wall
20 Catalyst layer

The invention claimed is:

1. An exhaust gas purification filter that is configured to be arranged in an exhaust path of an internal combustion engine and configured to collect particulate matter in exhaust gas exhausted from the internal combustion engine, the exhaust gas purification filter comprising:
    a base; and
    a catalyst layer provided on the base,
    wherein:
        the catalyst layer contains a carrier and a metal catalyst,
        the catalyst layer has a multiple pore structure having first pores and second pores, the first pores are defined by a framework consisting of the carrier, and the second pores: (i) are formed inside the framework, (ii) are connected to each other, and (iii) communicate with the first pores, and
        large pores present in the catalyst layer and that have a circle equivalent diameter greater than 5 μm occupy, when an area of the catalyst layer is 100% in an electron microscope observation image of a cross section of the catalyst layer, 45% or more of the area.

2. The exhaust gas purification filter according to claim 1, wherein the large pores occupy, when an area of whole pores is 100% in the electron microscope observation image of the cross section of the catalyst layer, 60% or more of the area.

3. The exhaust gas purification filter according to claim 1, wherein a porosity of the catalyst layer is 70% or more in the electron microscope observation image of the cross section of the catalyst layer.

4. The exhaust gas purification filter according to claim 1, wherein the first pores have a pore size of 1 μm or more and less than 10 μm and the second pores have a pore size of 0.5 μm or more and less than 1 μm .

5. The exhaust gas purification filter according to claim 4, wherein a pore volume of the first pores is four times or more of a pore volume of the second pores in pore distribution measurement of a mercury porosimeter.

6. The exhaust gas purification filter according to claim 1, wherein a surface opening ratio is 25% or more in an electron microscope observation image of a surface of a framework of the catalyst layer.

7. The exhaust gas purification filter according to claim 1, wherein both a pore size $P_5$ corresponding to a cumulative 5% pore size from a small pore side and a pore size $P_{95}$ corresponding to a cumulative 95% pore size from the small pore side are 0.02 µm or more and 4 µm or less in the electron microscope observation image of the surface of the framework of the catalyst layer.

8. The exhaust gas purification filter according to claim 1, wherein
the base has a wall flow structure in which input-side cells with an end thereof on an exhaust gas inflow side opened and output-side cells with an end thereof on an exhaust gas outflow side opened are partitioned by a porous partition wall, and
the catalyst layer is provided on a surface of the partition wall on a side of the input-side cells.

9. The exhaust gas purification filter according to claim 8, wherein the catalyst layer has, when a whole length in an extending direction of the partition wall is 100%, a length that is 90% or more of the whole length along the extending direction of the partition wall from the end on the exhaust gas inflow side.

10. The exhaust gas purification filter according to claim 1, wherein a second catalyst layer containing a carrier and a metal catalyst is formed inside the base.

11. The exhaust gas purification filter according to claim 1, wherein the catalyst layer is formed from a slurry including the carrier, the metal catalyst, and a pore shaping agent.

12. The exhaust gas purification filter according to claim 11, wherein the pore shaping agent is at least one selected from the group consisting of starch, carbon powder, active carbon, polyethylene, polypropylene, melamine resin, and polymethyl methacrylate resin.

13. The exhaust gas purification filter according to claim 12, wherein the pore shaping agent is starch or melamine resin.

14. The exhaust gas purification filter according to claim 11, wherein the pore shaping agent has an average particle size in a range of from 10 µm to 20 µm.

* * * * *